United States Patent
Fujita et al.

(10) Patent No.: US 9,573,622 B2
(45) Date of Patent: Feb. 21, 2017

(54) ROTATIONAL ANGLE DETECTING DEVICE AND ELECTRIC POWER STEERING DEVICE USING THE SAME

(71) Applicant: DENSO CORPORATION, Kariya, Aichi-pref. (JP)

(72) Inventors: Toshihiro Fujita, Chita-gun (JP); Takaharu Kozawa, Konan (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/631,334

(22) Filed: Feb. 25, 2015

(65) Prior Publication Data

US 2015/0239501 A1   Aug. 27, 2015

(30) Foreign Application Priority Data

Feb. 27, 2014  (JP) .................................. 2014-36946
Jan. 29, 2015  (JP) ................................. 2015-015566

(51) Int. Cl.
*B62D 15/02* (2006.01)
*B62D 5/04* (2006.01)

(52) U.S. Cl.
CPC ......... *B62D 15/0235* (2013.01); *B62D 5/0481* (2013.01); *B62D 15/021* (2013.01)

(58) Field of Classification Search
CPC .. B62D 5/0481; B62D 15/021; B62D 15/0235
USPC .......... 701/41; 180/443; 318/400.04, 400.21, 318/807, 434, 465
See application file for complete search history.

(56) References Cited

U.S. PATENT DOCUMENTS

2005/0093505 A1* 5/2005 Kameya ................. B62D 5/046
                                                            318/805
2006/0145652 A1* 7/2006 Ta ............................ H02P 6/16
                                                            318/807
2012/0273290 A1  11/2012 Kawano et al.

FOREIGN PATENT DOCUMENTS

JP   2012-103090   5/2012
JP   5339094       11/2013

OTHER PUBLICATIONS

Kozawa et al. U.S. Appl. No. 14/631,260, filed Feb. 25, 2015.

* cited by examiner

*Primary Examiner* — Marthe Marc-Coleman
(74) *Attorney, Agent, or Firm* — Nixon & Vanderhye P.C.

(57) ABSTRACT

A rotational angle detecting device continues a portion of operation by electric power from a battery when an electric switch is off. The rotational angle detecting device includes a sensor, a first calculator, a second calculator and a communication portion. The sensor detects a detection value that is variable according to a rotation of a detection object. The first calculator starts calculating first rotational information associated with the rotation of the detection object based on the detection value when the electric switch is turned on. The first calculator stops calculating the first rotational information when the electric switch is turned off. The second calculator calculates second rotational information associated with the rotation of the detection object regardless of an on/off state of the electric switch, based on the detection value. The communication portion outputs the first rotational information and the second rotational information to a controller.

19 Claims, 19 Drawing Sheets

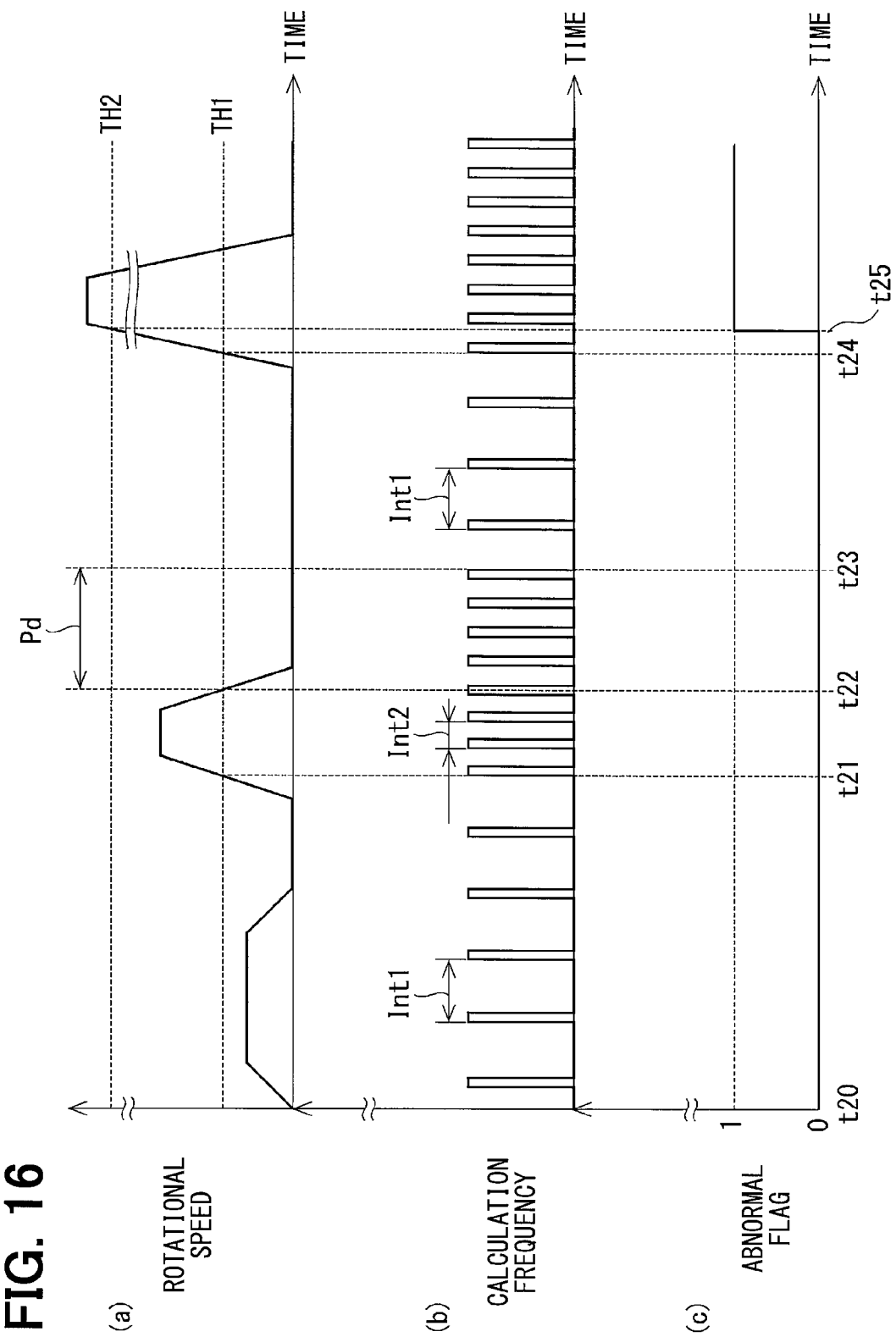

ROTATIONAL ANGLE DETECTING DEVICE AND ELECTRIC POWER STEERING DEVICE USING THE SAME

CROSS REFERENCE TO RELATED APPLICATION

This application is based on and incorporates herein by reference Japanese Patent Application No. 2014-36946 filed on Feb. 27, 2014, and Japanese Patent Application No. 2015-15566 filed on Jan. 29, 2015.

TECHNICAL FIELD

The present disclosure relates to a rotational angle detecting device and an electric power steering device using the same.

BACKGROUND

Conventionally, an electric power steering device having an angle sensor to detect a steering angle of a steering wheel has been known. For example, in a Patent Literature (JP 5339094 B), an angle sensor includes a motor rotational angle sensor that detects a rotational angle of an electric motor, and the angle sensor calculates a rotational angle of a steering shaft based on the rotational angle of the electric motor that is detected by the motor rotational angle sensor. Further, in the Patent Literature, to reduce electric consumption, electric power is intermittently supplied to the angle sensor from the battery.

SUMMARY

According to the study by inventors of the present disclosure, if electric power is intermittently supplied to the angle sensor from the battery, as described in the Patent Literature, erroneous counting of the number of rotations of the electric motor may occur according to a setting condition of the intermittent power supply. If a frequency of the intermittent power supply is increased to avoid the erroneous counting, the electric consumption would be rather increased compared with a case in which electric power is continuously supplied to the angle sensor, taking a startup time of the angle sensor into account.

It is an objective of the present disclosure to provide a rotational angle detecting device with low power consumption and an electric power steering device using the same.

In an aspect of the present disclosure, a rotational angle detecting device continues a portion of operation by electric power from a battery when an electric switch is off. The rotational angle detecting device includes a sensor, a first calculator, a second calculator and a communication portion.

The sensor detects a detection value that is variable according to a rotation of a detection object.

The first calculator starts calculating first rotational information associated with the rotation of the detection object based on the detection value detected by the sensor when the electric switch is turned on. The first calculator stops calculating the first rotational information when the electric switch is turned off.

The second calculator calculates second rotational information associated with the rotation of the detection object regardless of an on/off state of the electric switch, based on the detection value detected by the sensor.

The communication portion outputs the first rotational information and the second rotational information to a controller.

In the aspect of the present disclosure, functions of the rotational angle detecting device are divided. That is, when the electric switch is off, the calculation of the first rotational information, which is unnecessary when the electric switch is off, is stopped, whereas calculation of the second rotational information, which is necessary when the electric switch is off, is continued. Thus, operation of the rotational angle detecting device is limited to the minimum necessary operation when the electric switch is off. Therefore, electric consumption of the rotational angle detecting device can be reduced when the electric switch is off. Further, the second rotational information, which is calculated when the electric switch is off, can be used for a variety of calculations.

It should be noted that the first rotational information may be, for example, a rotational angle, and the second rotational information may be, for example, a number of rotations.

The rotational angle detecting device according to the present disclosure may be applied to an electric power steering device. The electric power steering device includes a motor that outputs an assistance torque to assist steering of a steering member by a driver and an electric control unit. The electric control unit includes the rotational angle detecting device and the controller that controls the motor. The detection object for the rotational angle detecting device is the motor. The controller calculates an rotational angle of the steering shaft, which is connected to a steering member manipulated by a driver, based on the first rotational information and the second rotational information.

The rotational angle detecting device continues calculating the second rotational information even when the electric switch is off. Thus, the second rotational information that is calculated when the electric switch is off can be used for a variety of calculations.

BRIEF DESCRIPTION OF THE DRAWINGS

The disclosure, together with additional objectives, features and advantages thereof, will be best understood from the following description, the appended claims and the accompanying drawings, in which:

FIG. 16 is a timing diagram describing a process for detecting the rotation number;

DETAILED DESCRIPTION

Figure 1:
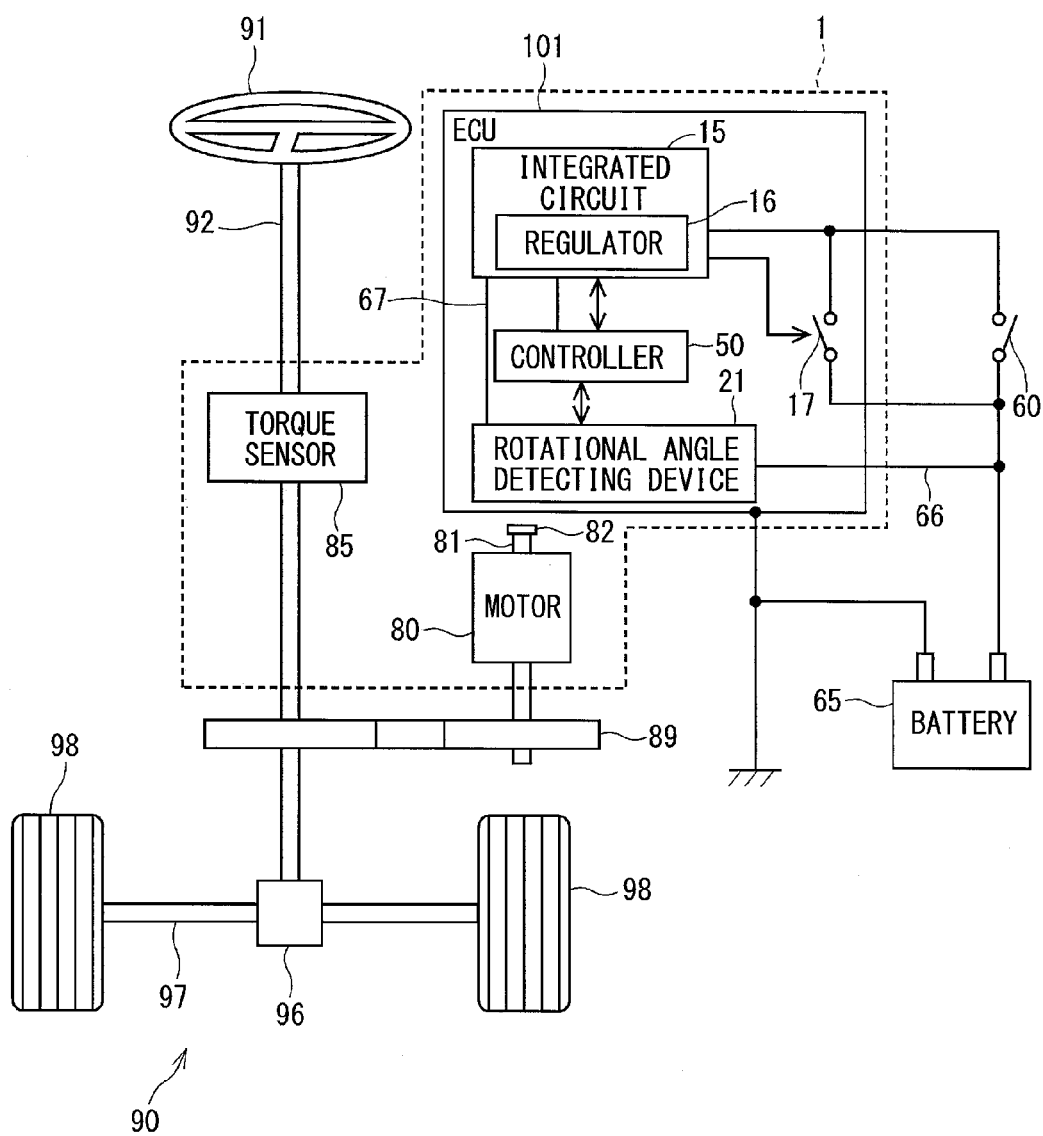
FIG. 1 is a schematic view of an electric power steering device.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

FIGS. 1 to 5 show a rotational angle detecting device and an electric power steering device according to the first embodiment.

As shown in FIG. 1, the rotational angle detecting device 21 and a motor 80 are applied to the electric power steering device 1 that supports steering by a driver.

FIG. 1 shows an entire configuration of a steering system 90 including the electric power steering device 1. The steering system 90 includes a steering wheel 91 as a steering member, a steering shaft 92, a pinion gear 96, a rack shaft 97, wheels 98 and the electric power steering device 1.

The steering wheel 91 is mechanically connected to the steering shaft 92. The pinion gear 96 is disposed at an end of the steering shaft 92, and engages the rack shaft 97. The two wheels 98 are connected to both ends of the rack shaft 97 through, for example, tie rods.

When a driver manipulates the steering wheel 91, the steering shaft 92 connected to the steering wheel 91 rotates. A rotational motion of the steering shaft 92 is converted into a linear motion of the rack shaft 97 through the pinion gear 96, and the wheels 98 are steered (i.e., rotate) by a steering angle according to a displacement of the rack shaft 97.

The electric power steering device 1 includes the motor 80, a reduction gear 89, an electric control unit (ECU) 101 and a torque sensor 85. The motor 80 outputs an assistance torque to assist steering of the steering wheel 91 by a driver. The reduction gear 89 reduces a rotation of the motor 80 and transmits the reduced rotation to the steering shaft 92 or the rack shaft 97. The ECU 101 controls the motor 80.

The torque sensor 85 is attached to the steering shaft 92 and detects a steering torque applied to the steering wheel 91 by a driver.

The motor 80 is operated by electric power supplied from the battery 65 through an inverter circuit 71 (refer to FIG. 15, not shown in FIG. 1) and rotates the reduction gear 89 in a forward or backward direction.

The motor 80 is a three-phase brushless motor and includes a shaft 81, a rotor (not shown), stator (not shown), or the like. The rotor is a cylindrical member and rotates together with the shaft 81. A permanent magnet is disposed on a surface of the rotor, and thus the rotor has magnetic poles. The stator rotatably houses the rotor therein relative to the stator. The stator has protrusions, which inwardly protrude in a radial direction of the stator, and the protrusions are arranged with intervals in a circumferential direction of the stator. A winding wire is wound around each protrusion. The rotor and the shaft 81 rotate by switching energization to the winding wires. One end of the shaft 81 protrudes from a motor case toward the ECU 101, and a magnet 82 is disposed on the one end of the shaft 81. The magnet 82 may provide a "detection object" in the present embodiment.

The ECU 101 includes an integrated circuit 15, a relay 17, the rotational angle detecting device 21, the controller 50, the invertor circuit 71, or the like. Each electric component of the ECU 101 is disposed on a substrate 11 (refer to FIG. 13, not show in FIG. 1) positioned close to the magnet 82 of the motor 80.

The integrated circuit 15 has a main regulator 16, as "regulator". Electric power from the battery 65 is supplied to the integrated circuit 15 through an ignition switch (IG switch) 60. Further, electric power is supplied to the integrated circuit 15 through the relay 17 from the battery 65. The ignition switch 60 may provide an "electric switch".

The main regulator 16 adjusts voltage applied from the battery 65 to a specified voltage, and outputs the specified voltage to the rotational angle detecting device 21 and the controller 50. Here, the voltage adjusted by the main regulator 16 (i.e., the specified voltage) is referred to "regulator voltage" and voltage of the battery 65 is referred to "battery voltage".

The relay 17 is disposed between the integrated circuit 15 and the battery 65. For example, a mechanical relay or a semiconductor element may be used as the relay 17.

When the ignition switch 60 is turned on, electric power is supplied to the integrated circuit 15 from the battery 65, and then the controller 50 is activated. The controller 50 outputs an ON command to turn on the relay 17 to the integrated circuit 15 after determining that the electric power steering device 1 normally starts operation. The relay 17 is turned on when the integrated circuit 15 receives the ON command from the controller 50.

The relay 17 is turned off by the integrated circuit 15, when abnormality in the electric power steering device 1 occurs, or when a termination process of the electric power steering device 1 is completed. When the ignition switch 60 and the relay 17 are turns off, the integrated circuit 15 and the main regulator 16 are also turned off.

In the present embodiment, electric power can be supplied to the integrated circuit 15 through the relay 17 even when the ignition switch 60 is turned off. For this reason, power supply to the controller 50 is continued after the ignition switch 60 is turned off. After the ignition switch 60 is turned off, the controller 50 executes a given termination process, and when the termination process is completed, the controller 50 outputs a stop signal to the integrated circuit 15. The integrated circuit 15 outputs a signal to the relay 17 to turn off the relay 17 when receiving the stop signal from the controller 50. In other words, when the termination process of the controller 50 is completed after the ignition switch 60 is turned off, electric power is not supplied to the integrated circuit 15 including the main regulator 16 and the controller 50.

The rotational angle detecting device 21 outputs information that is variable according to a rotation of the motor 80. More specifically, the rotational angle detecting device 21 detects a change of a magnetic field generated by rotation of the magnet 82 that integrally rotates with the rotor and the shaft 81. It should be noted that, in a schematic view of the steering system 90 as illustrated in FIG. 1, the rotational angle detecting device 21 is positioned separately from the magnet 82. However, the rotational angle detecting device 21 (especially, a sensor 25 as described below) is positioned so close to the magnet 82 as to detect a rotating magnetic field of the magnet 82.

The rotational angle detecting device 21 is directly connected to the battery 65 through a harness 66 without through the ignition switch 60, and electric power from the battery 65 is directly supplied to the rotational angle detecting device 21. Hence, electric supply to the rotational angle detecting device 21 from the battery 65 is maintained even when the ignition switch 60 is off. Accordingly, the rotational angle detecting device 21 can perform at least a portion of operation when the ignition switch 60 is off, as described below.

Further, the regulator voltage adjusted by the main regulator 16 is applied to the rotational angle detecting device 21 through the harness 67.

Figure 2:
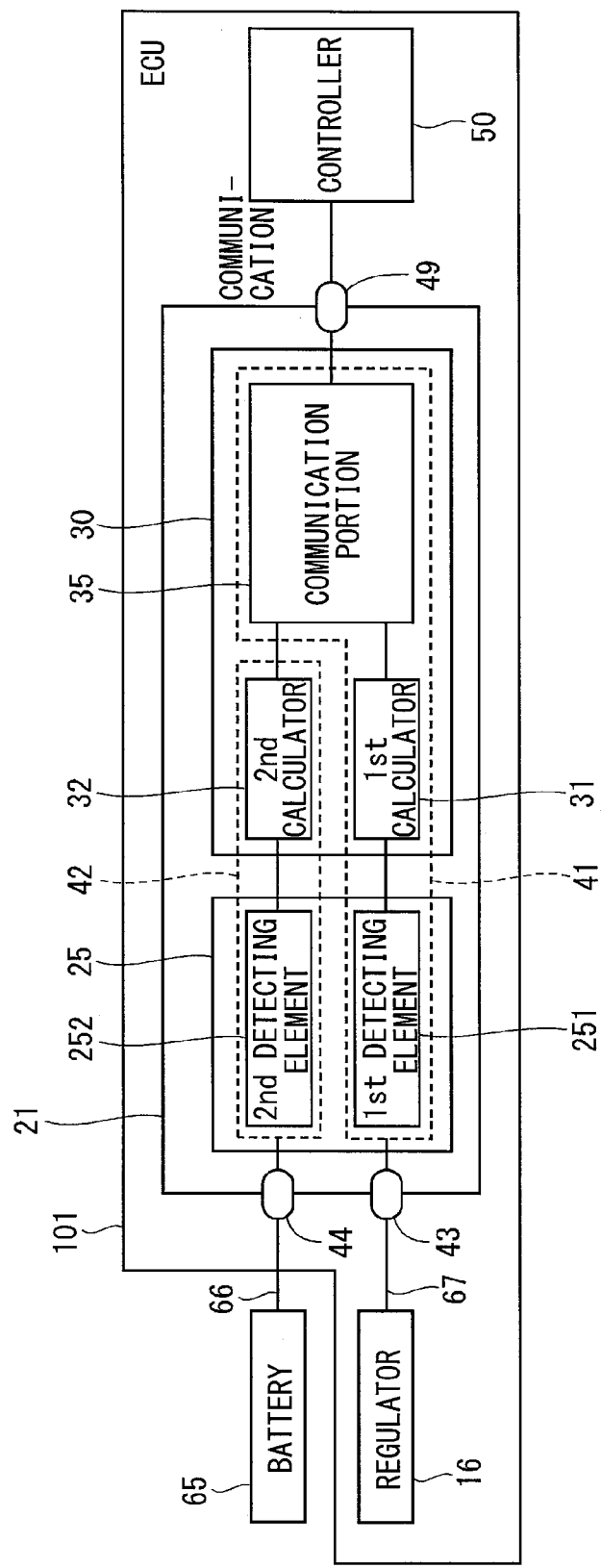
FIG. 2 is a block diagram of an electric control unit of the electric power steering device.

As shown in FIG. 2, the rotational angle detecting device 21 includes a sensor 25, a circuit portion 30, a regulator voltage input terminal 43 as a regulator state obtaining portion, a battery voltage input terminal 44, and a communication terminal 49, which are formed into one package.

The sensor 25 includes a first detecting element 251 and a second detecting element 252. The first and second detecting elements 251 and 252 are configured with, for example, a hall effect sensor (a hall element) or an MR (magnetroresistive) sensor (an MR element), and detects a rotating magnetic field that is variable according to a rotation of the magnet 82. In the present embodiment, "the rotating magnetic field that is variable according to a rotation of the magnet 82" may correspond to "detection value that is variable according to a rotation of the detection object".

The circuit portion 30 includes a first calculator 31, a second calculator 32 and a communication portion 35.

Figure 3:
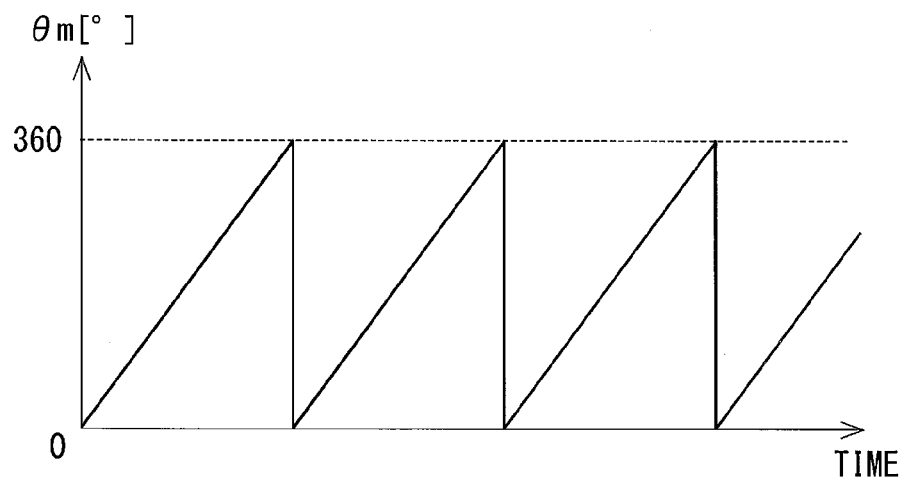
FIG. 3 is a timing diagram describing a change of a rotational angle.

The first calculator 31 calculates a rotational angle θm of the motor 80 based on a first detection value that is a detection value output from the first detecting element 251. The rotational angle θm in the present embodiment is a "mechanical angle". FIG. 3 illustrates a change of the rotational angle θm when the motor 80 rotates with a constant rotational speed.

Each process by the first calculator 31 may be executed by a CPU as a software processing by performing a program stored a memory in advance, or may be executed by a specific electric circuit as a hardware processing. Likewise, process by the second calculator 32, process by the controller 50 and process by a calculation portion (as described below in another embodiment) may be executed as a software processing or a hardware processing.

Figure 4:
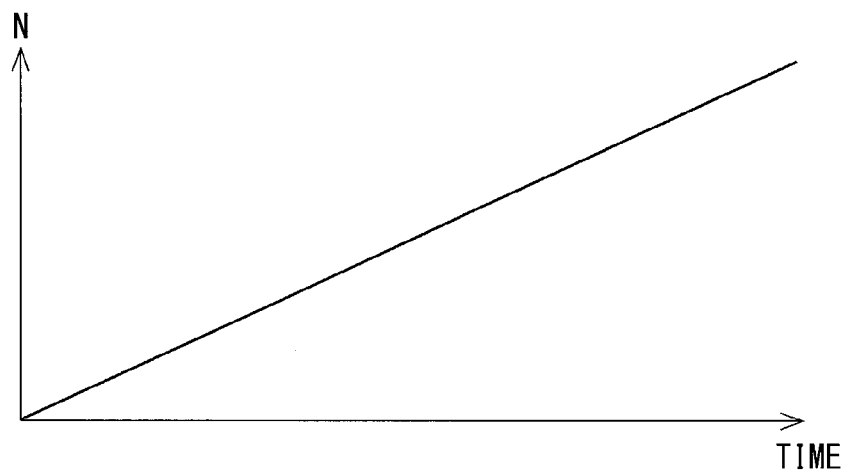
FIG. 4 is a timing diagram describing a change of a rotation number.

The second calculator 32 calculates a number of rotations (rotation number N) of the motor 80 based on a second detection value that is a detection value output from the second detecting element 252. FIG. 4 illustrates a change of the rotation number N when the motor 80 rotates with a constant rotational speed. It should be noted that, since the rotation number N is numerically (digitally) counted up at every rotation of the magnet 82, the rotation number N technically increases in steps. The rotation number N may be directly calculated based on the second detection value or indirectly calculated based on the rotational angle θm.

One rotation of the motor 80 (more precisely, one rotation of the magnet 82) is divided into detection areas having the rotational angle θm equal to or less than 180 degrees. The second calculator 32 calculates a value associated with the rotation number N (e.g., a count value), and the value is assigned to each of the detection areas. The second calculator 32 calculates the rotation number N at a calculation interval, which is set to be constant in the first embodiment.

In the present embodiment, the rotational angle θm may correspond to "first rotational information", and the rotation number N may correspond to "second rotational information".

The communication portion 35 is, for example, a serial interface. The communication portion 35 outputs information associated with the rotational angle θm calculated by the first calculator 31, and information associated with the rotation number N calculated by the second calculator 32, to the controller 50 through the communication terminal 49. The communication portion 35 receives several signals from the controller 50 through the communication terminal 49.

In the present embodiment, the first detecting element 251, the first calculator 31 and the communication portion 35 constitute a first sensor group 41, and the second detecting element 252 and the second calculator 32 constitute a second sensor group 42.

Electric power is supplied to the first sensor group 41 from the main regulator 16 through the regulator voltage input terminal 43. When the main regulator 16 is turned on, voltage applied from the regulator voltage input terminal 43 to the first sensor group 41 is substantially equal to the regulator voltage. In other words, the regulator voltage input terminal 43 obtains an on state of the main regulator 16 when the main regulator 16 is turned on. Whereas, when the main regulator 16 is turned off, voltage applied from the regulator voltage input terminal 43 to the first sensor group 41 is substantially zero. In this case, the regulator voltage input terminal 43 obtains an off state of the main regulator 16 when the main regulator 16 is turned off. That is, the on/off state of the main regulator 16 can be determined based on voltage applied from the regulator voltage input terminal 43.

Electric power is supplied to the second sensor group 42 from the battery 65 through the battery voltage input terminal 44 without through the ignition switch 60. That is, the battery voltage is applied to the second sensor group 42 from the battery 65.

In the present embodiment, since electric power is not supplied to the first sensor group 41 when the main regulator 16 is off, the first sensor group 41 does not operate during an off state of the main regulator 16. Thus, when the main regulator 16 is turned off, the regulator voltage input terminal 43 obtains the off state of the main regulator 16. Therefore, the first calculator 31 does not calculate the rotational angle θm when the main regulator 16 is off. Further, the communication portion 35 does not output information associated with the rotational angle θm and the rotation number N, and does not receive the several signals from the controller 50, when the main regulator 16 is off.

Whereas, electric power is supplied to the second sensor group 42 from the battery 65 regardless of the on/off state of the main regulator 16 and the on/off state of the ignition switch 60. Therefore, the second sensor group 42 continues operation thereof. Hence, the second calculator 32 continues calculating the rotation number N regardless of the on/off state of the main regulator 16. Further, the second calculator 32 retains (keeps storing) the information associated with the rotation number N that is calculated when the main regulator 16 is off. The information associated with the rotation number N, which is stored in the second calculator 32, is output from the communication portion 35 to the controller 50 when the ignition switch is turned on and the controller 50 is activated.

As described above, the second detecting element 252 continues operation even when the ignition switch 60 is off. Therefore, the second detecting element 252 preferably has a high electric consumption efficiency compared to the first detecting element 251 that stops operation when the ignition switch 60 is off. Further, the second detecting element 252 is not required to have calculating performance as accurate as the first detecting element 251 that calculates the rotational angle θm, as far as the second detecting element 252 can calculate the rotation number N at least one time at the rotational angle θm less than 180 degrees (e.g., every 90 degrees).

As shown in FIG. 1, the controller 50 that controls the motor 80 includes a microcomputer that executes a variety of calculations. The controller 50 is electrically connected to the battery 65 through the main regulator 16 and so on, and electric power is supplied to the controller 50 from the battery 65.

The controller 50 obtains the rotational angle θm of the motor 80 and the rotation number N from the rotational angle detecting device 21. The controller 50 controls the motor 80 based on the rotational angle θm, a steering angle θst that is a rotational angle of the steering shaft 92, a steering torque detected by the torque sensor 85, or the like.

The controller 50 calculates the steering angle θst based on the rotational angle θm, the rotation number N, and a gear ratio of the reduction gear 89. With the configuration, a steering sensor that detects the steering angle θst can be eliminated.

The controller 50 learns a neutral position of the steering wheel 91 based on, for example, the steering angle θst calculated while a vehicle is in straight travel at a constant speed for a specified time. The controller 50 stores the neutral position calculated. In other words, the controller 50 learns an absolute angle of the steering wheel 91.

If the steering wheel 91 is manipulated by a driver during the off state of the ignition switch 60, the steering angle θst would be changed. Along with the change of the steering angle θst, the rotational angle θm and the rotation number N may be also changed.

However, if the rotation number N during the off state of the ignition switch 60 and the rotational angle θm at the time of turning on the ignition switch 60 (i.e., a motor position) are available when the ignition switch 60 is turned on again, the steering angle θst can be calculated using the neutral position of the steering wheel 91 stored in the controller 50 along with the rotational information. Therefore, in the present embodiment, the second calculator 32 continues calculating the rotation number N even when the ignition switch 60 is off. Therefore, when the ignition switch 60 is turned on, the controller 50 need not relearn the neutral position of the steering wheel 91. However, it should be noted that, if the rotation number N is not calculated during the off state of the ignition switch 60, the neutral position of the steering wheel 91 needs to be relearned to obtain the steering angle θst. Further, to calculate the steering angle θst, the value of the rotational angle θm at the time of turning on the ignition switch 60 is necessary. In other words, continuous calculation of the rotational angle θm during the off state of the ignition switch 60 is not necessary.

In view of the above, functions of the rotational angle detecting device 21 are divided into the first sensor group 41 and the second sensor group 42, and the first sensor group 41 is operated by electric power from the main regulator 16 and the second sensor group 42 is operated by electric power from the battery 65. Accordingly, when the ignition switch 60 is off, calculation and output of the rotational angle θm by the first sensor group 41 is stopped while calculation of the rotation number N is continued.

Next, a switching of an on/off state in the first sensor group 41 and the second sensor group 42 will be described with reference to a timing diagram illustrated in FIG. 5.

At timing t0, the battery voltage is applied to the rotational angle detecting device 21 from the battery voltage input terminal 44, and the second sensor group 42 is turned on. The second sensor group 42 is constantly in the on state except a period between timing t11 and timing t12 during which electric power from the battery 65 is not supplied. The no power supply period occurs, for example, when the battery 65 is replaced or a voltage drop of the battery 65 (i.e., "battery exhaustion") occurs.

At timing t1, the ignition switch 60 is turned on, the main regulator 16 is turned on at timing t2. In the present embodiment, the first sensor group 41 is turned on at the timing t2 when the main regulator 16 is turned on, since the regulator voltage is applied to the first sensor group 41 from the regulator voltage input terminal 43. At timing t3, the controller 50 is activated.

When the ignition switch 60 is turned off at timing t4, the controller 50 executes the termination process, and the main regulator 16 and the controller 50 are turned off at timing t5. The first sensor group 41 is turned off at the timing t5 when the main regulator 16 is turned off.

When the ignition switch 60 is turned on again at timing t6, the main regulator 16 and the first sensor group 41 are turned on at timing t7, and then the controller 50 is activated at timing t8. Further, when the ignition switch 60 is turned off at timing t9, the controller 50 executes the termination process, and the main regulator 16, the first sensor group 41, and the controller 50 are turned off at timing t10.

Figure 5:
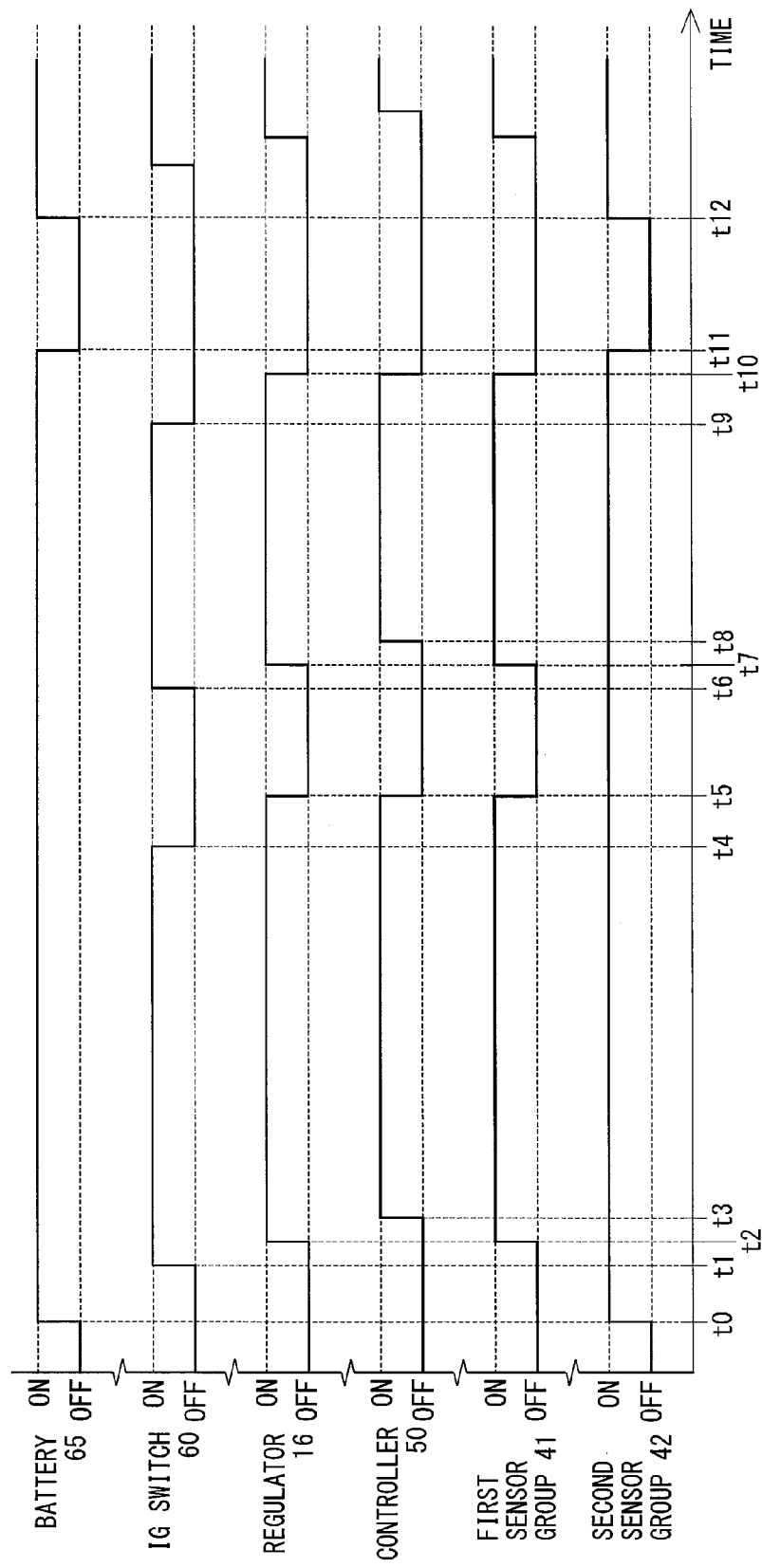
FIG. 5 is a timing diagram of a process of the electric control unit.
Figure 8:
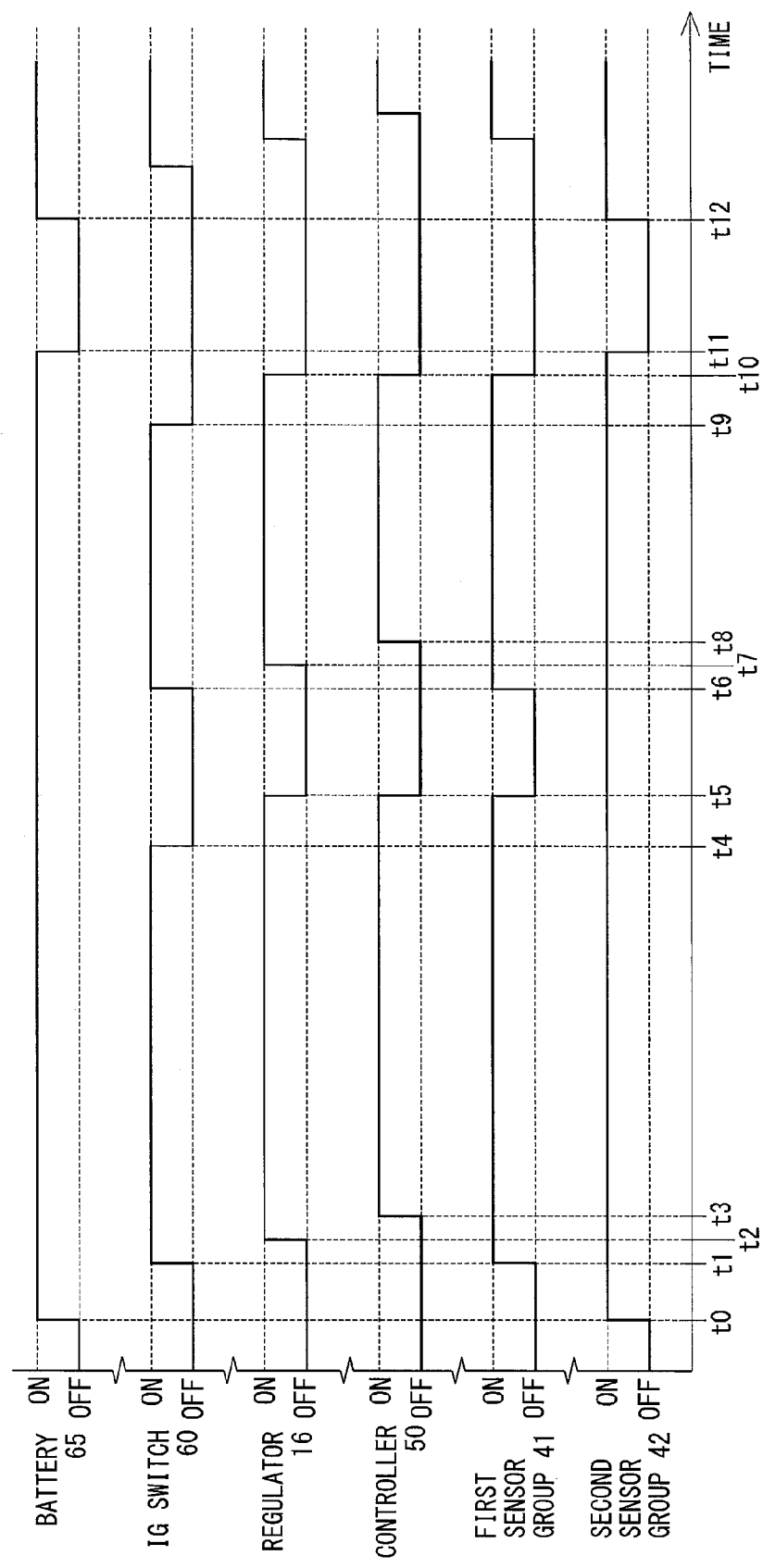
FIG. 8 is a timing diagram of a process of the electric control unit.
Figure 10:
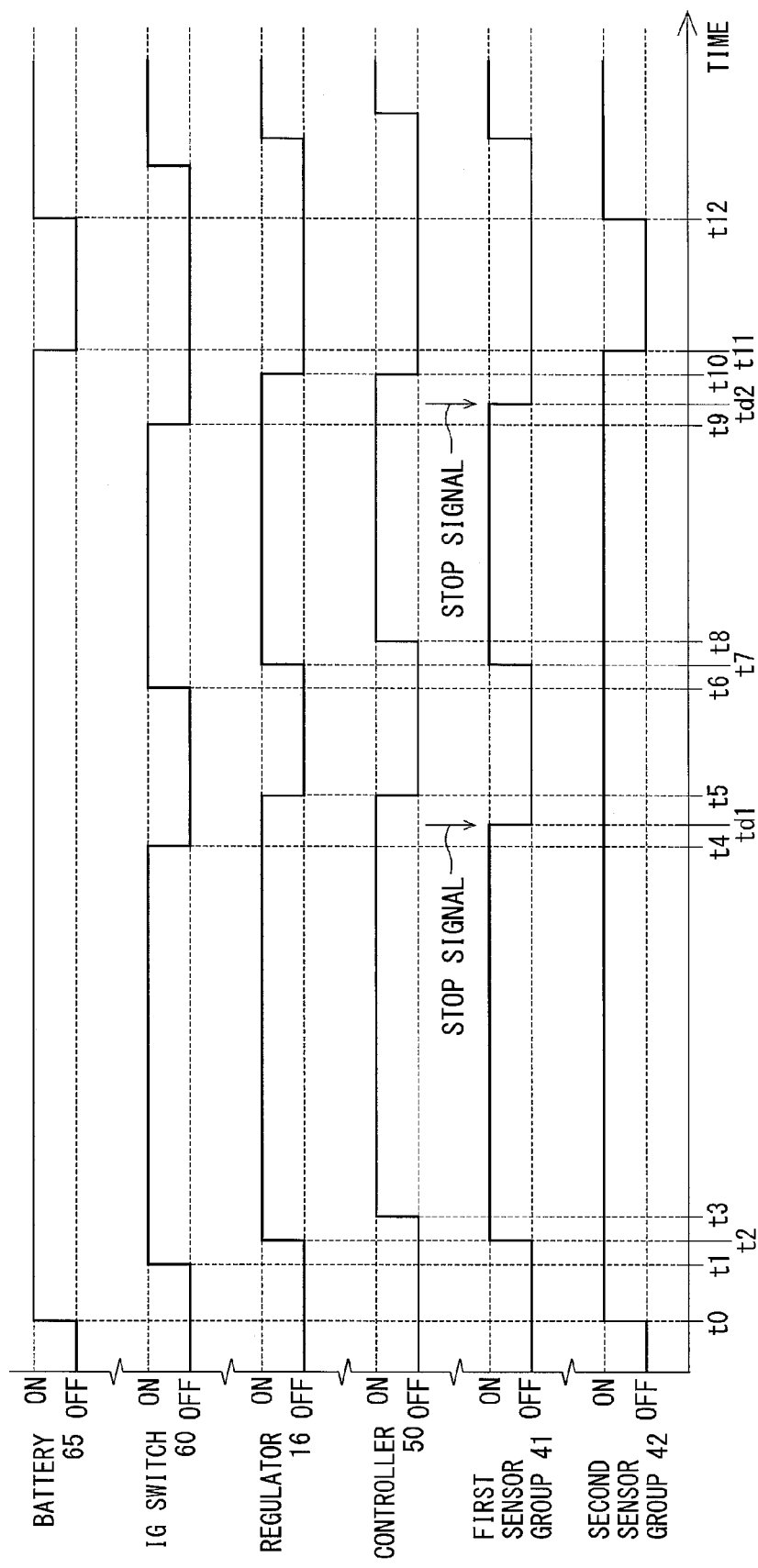
FIG. 10 is a timing diagram of a process of the electric control unit.
Figure 12:
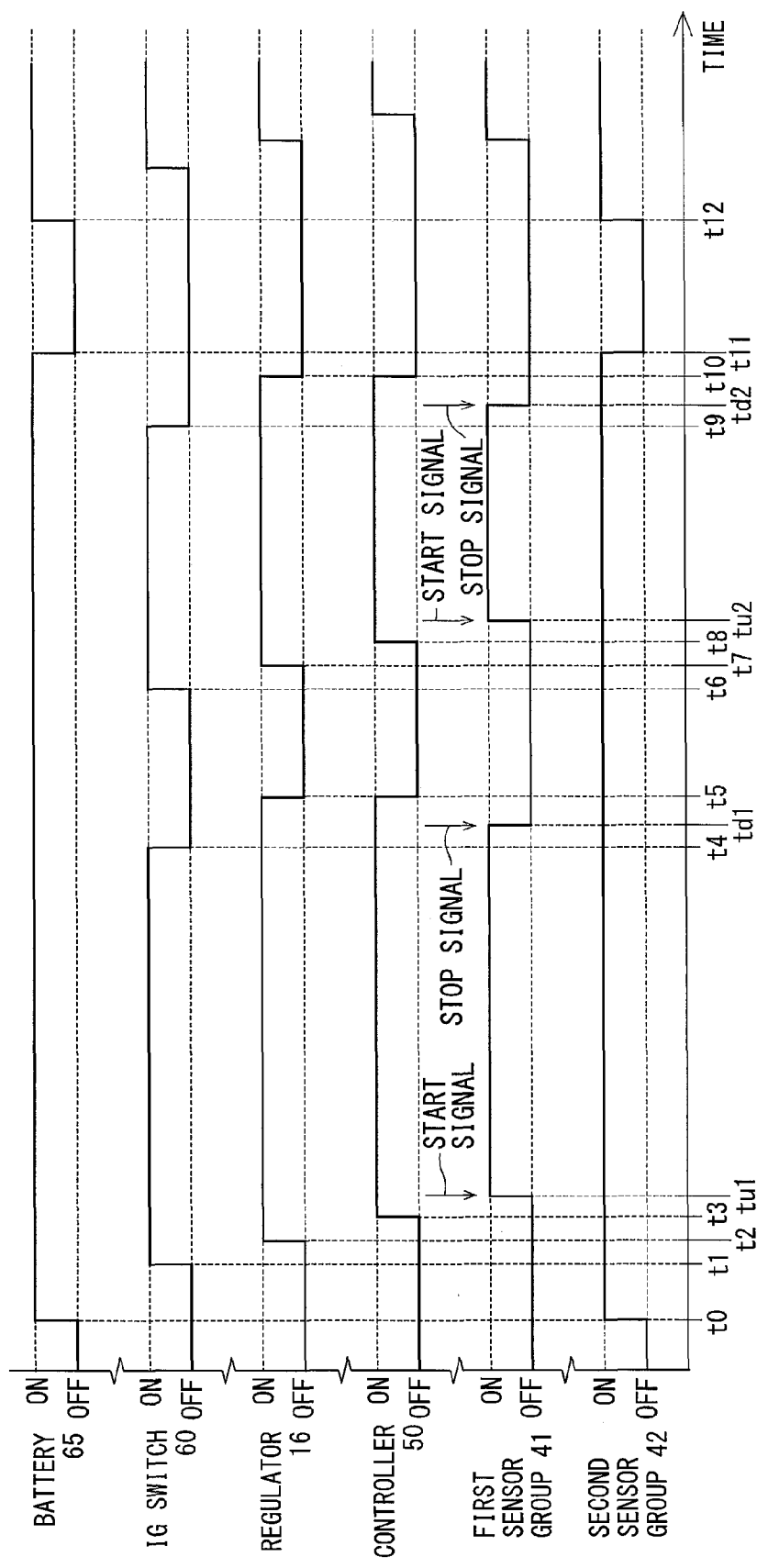
FIG. 12 is a timing diagram of a process of the electric control unit.

It should be noted that, since FIG. 5 schematically illustrates the timing diagram of the on/off state of the first and second sensor groups 41, 42, intervals between the respective timings t0 to t12 in FIG. 5 may not coincide with the actual intervals, which are equally applied to FIGS. 8, 10 and 12.

In the present embodiment, when the main regulator 16 is turned on, the first calculator 31 determines that the ignition switch 60 is turned on and starts calculating the rotational angle θm. Further, when the main regulator 16 is turned off, the first calculator 31 determines that the ignition switch 60 is turned off and stops calculating the rotational angle θm.

Therefore, electric consumption during the off state of the ignition switch 60 can be reduced compared with a case in which the first sensor group 41 would continue calculating the rotational angle θm during the off state of the ignition switch 60.

Whereas, the second calculator 32 continues calculating the rotation number N regardless of the on/off state of the ignition switch 60 Thus, the controller 50 can calculate the steering angle θst without relearning the neutral position of the steering wheel 91 when the ignition switch 60 is turned on again. As described above, the rotational angle detecting device 21 according to the present embodiment continues a portion of operation by electric power from the battery 65 when the ignition switch 60 is on. The rotational angle detecting device 21 includes the sensor 25, the first calculator 31, the second calculator 32, and the communication portion 35.

The sensor 25 detects the rotating magnetic field of the magnet 82 that is variable according to a rotation of the motor 80.

The first calculator 31 starts calculating the rotational angle θm associated with the rotation of the motor 80 based on the detection value by the sensor 25 when the first calculator 31 determines that the ignition switch 60 is turned on, and stops calculating the rotational angle θm when the first calculator 31 determines that the ignition switch 60 is turned off.

The second calculator 32 calculates the rotation number N associated with the rotation of the motor 80 based on the detection value by the sensor 25 regardless of the on/off state of the ignition switch 60. In other words, the second calculator 32 continues calculating the rotation number N even when it is determined that the ignition switch 60 is off.

The communication portion 35 outputs the rotational angle θm and the rotation number N.

In the present embodiment, the functions of the rotational angle detecting device 21 are divided, and when it is determined that the ignition switch 60 is turned off, calculation of the rotational angle θm, which is unnecessary during the off state of the ignition switch 60, is stopped, whereas calculation of the rotation number N, which is necessary during the off state of the ignition switch 60, is continued. That is, in the present embodiment, the operation of the rotational angle detecting device 21 is limited to the minimum necessary operation when the ignition switch 60 is off. Therefore, electric consumption of the rotational angle detecting device 21 can be reduced when the ignition switch 60 is off. By reducing electric consumption during the off state of the ignition switch 60, it is possible to avoid a situation in which "battery exhaustion" occurs when the ignition switch 60 is maintained to be off for a long time. Further, the rotation number N that is calculated when the ignition switch 60 is off can be used for a variety of calculations.

In the present embodiment, the detection object is the motor 80, which is a member rotating together with the shaft 81. The first rotational information and the second rotational information are the rotational angle θm and the rotation number N of the motor 80, respectively. In the present embodiment, the calculation of the rotation number N can be continued even when the ignition switch 60 is off. Especially, in a case where the rotational angle detecting device 21 is applied to the electric power steering device 1, as described above, the steering angle θst can be calculated without relearning the neutral position of the steering wheel 91, when the ignition switch 60 is turned on again.

One rotation of the magnet 82 is divided into the detection areas having the rotational angle θm equal to or less than 180 degrees. The second calculator 32 in the present embodiment counts the value associated with the rotation number N at least one time at each detection area. Accordingly, abnormality in calculating the rotation number N can be detected by comparing the values counted by the second calculator 32 with a calculation result of the rotational angle θm when the ignition switch 60 is turned on.

The sensor 25 has the first detecting element 251, which stops operation when it is determined that the ignition switch 60 is turned off, and the second detecting element 252, which continues operation regardless of the on/off state of the ignition switch 60.

The first calculator 31 calculates the rotational angle θm based on the first detection value detected by the first detecting element 251. The second calculator 32 calculates the rotation number N based on the second detection value detected by the second detecting element 252.

In the present embodiment, the different detecting elements (i.e., the first detecting element 251, the second detecting element 252) for calculating the rotational angle θm and the rotation number N are used. Thus, proper detecting element can be selected according to information to be calculated. Furthermore, when a detecting element with a low electric consumption is used as the second detecting element 252 that continues detecting the second detection value even when the ignition switch 60 is off, electric consumption during the off state of the ignition switch 60 can be further reduced.

In the present embodiment, the regulator voltage input terminal 43 obtains and outputs the on/off state of the main regulator 16, which adjusts voltage from the battery 65 to a specified voltage.

The first calculator 31 determines that the ignition switch 60 is turns on when the main regulator 16 is turned on, and the first calculator 31 starts calculating the rotational angle θm. The first calculator 31 determines that the ignition switch 60 is turned off when the main regulator 16 is turned off, and the first calculator 31 stops calculating the rational angle θm.

Thus, the calculation of the rotational angle θm by the first calculator 31 can be properly started or stopped based on the regulator voltage that is input from the regulator voltage input terminal 43. Further, since stop and start of the calculation of the rotational angle θm are controlled by the common regulator voltage from the regulator voltage input terminal 34, the number of the terminal can be reduced compared with a case in which different voltages for stopping and starting the rotational angle θm would be used. Further, a calculating load to the controller 50 can be reduced by using the regulator voltage from the regulator voltage input terminal 43 compared with a case in which stop and start of the calculation of the rotation angle θm would be controlled by a command from the controller 50.

As described above, the rotational angle detecting device 21 is applied to the electric power steering device 1. The electric power steering device 1 includes the motor 80 that outputs an assistance torque to assist steering by a driver, and the ECU 101. The ECU 101 includes the rotational angle detecting device 21 for which the motor 80 is the detection object, and the controller 50 that controls the motor 80.

The controller 50 calculates the steering angle θst of the steering shaft 92 connected to the steering wheel 91, based on the rotational angle θm and the rotation number N.

The rotational angle detecting device 21 continues calculating the rotation number N when the ignition switch 60 is off. Thus, the controller 50 can calculate the steering angle θst, using the neutral position of the steering wheel 91 that is stored in the controller 50, based on the rotational angle θm, the rotation number N, and the gear ratio of the reduction gear 89. Furthermore, relearning of the neutral position of the steering wheel 91 can be eliminated when the ignition switch 60 is turned on again.

Second Embodiment

A rotational angle detecting device 22 of the second embodiment will be described below with reference to FIGS. 6 to 8.

Figure 6:
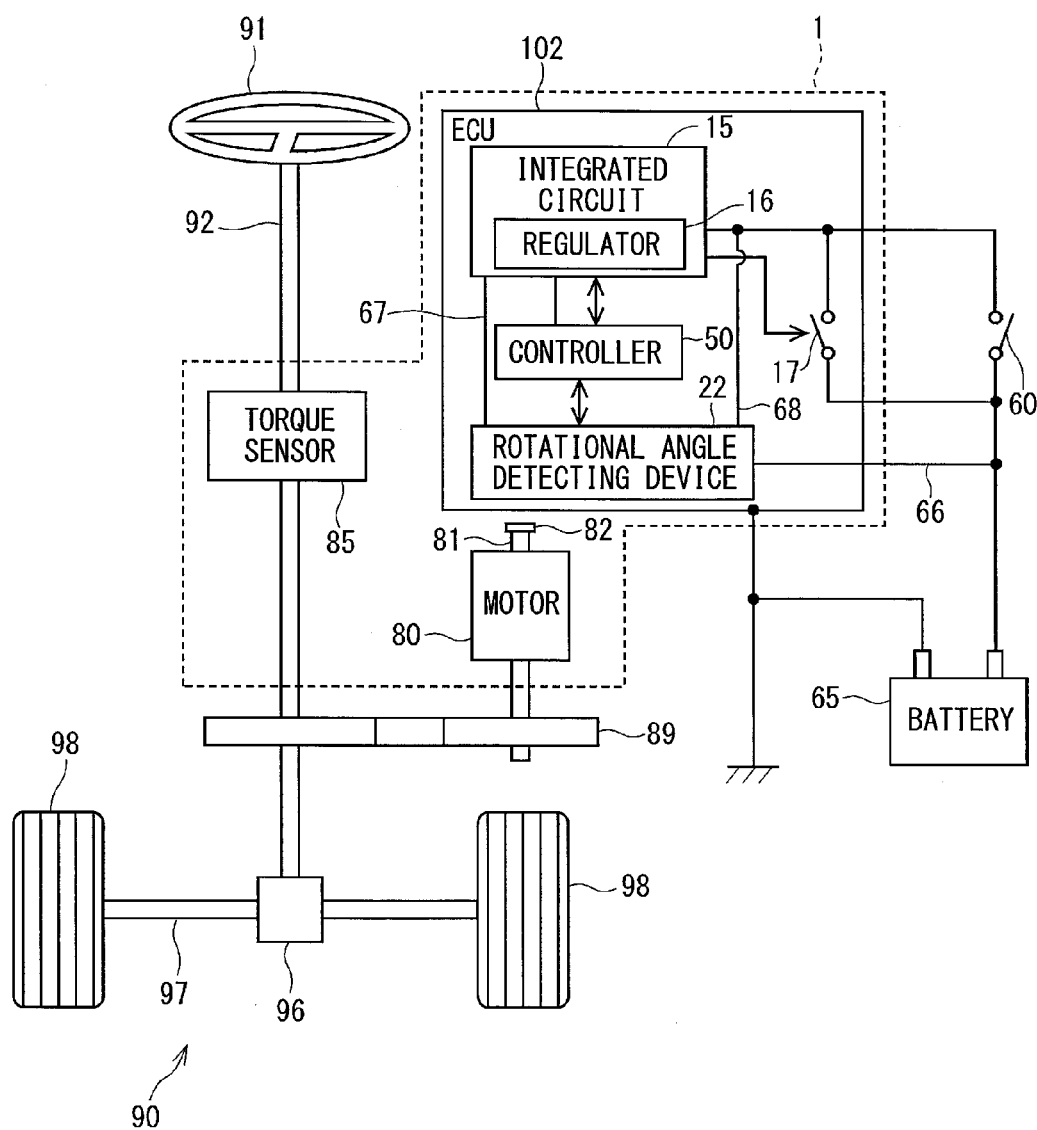
FIG. 6 is a schematic view of an electric power steering device.

As shown in FIG. 6, in the rotational angle detecting device 22 of the present embodiment, an ECU 102 has a harness 68 provided between the rotational angle detecting device 22 and a connecting point, which is positioned between the ignition switch 60 and the integrated circuit 15. Electric power from the battery 65 is supplied to the rotational angle detecting device 22 through the harness 68 as well as the harnesses 66 and 67.

Figure 7:
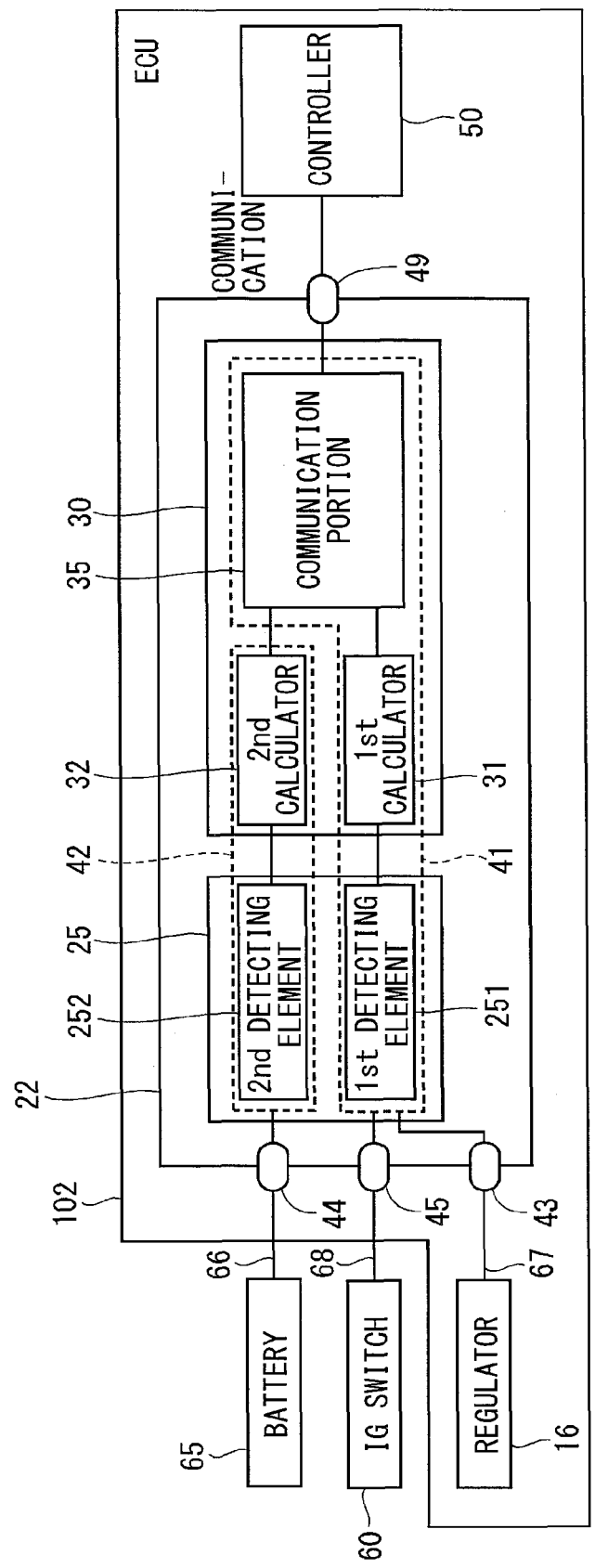
FIG. 7 is a block diagram of an electric control unit of an electric power steering device.

As shown in FIG. 7, the rotational angle detecting device 22 of the present embodiment includes an IG switch input terminal 45 as the ignition switch state obtaining portion. The IG switch input terminal 45 is connected between the ignition switch 60 and the integrated circuit 15 (refer to FIG. 6) through the harness 68. The IG switch input terminal 45 allows electric power to be supplied to the first sensor group 41. When the ignition switch 60 is turned on, a voltage applied through the IG switch input terminal 45 to the first sensor group 41 is equivalent to the battery voltage from the battery 65. In this case, the IG switch input terminal 45 obtains the on state of the ignition switch 60. Whereas, when the ignition switch 60 is turned off, a voltage applied through the IG switch input terminal 45 to the first sensor group 41 is substantially zero. In this case, the IG switch input terminal 45 obtains the off state of the ignition switch 60. That is, the on/off state of the ignition switch 60 can be determined based on a voltage applied through the IG switch input terminal 45.

In the present embodiment, the first sensor group 41 is turned on when the ignition switch 60 is turned on, and the first sensor group 41 is turned off when the ignition switch 60 is turned off. That is, as shown in FIG. 8, the first sensor group 41 is turned on at the timing t1 at which the ignition switch 60 is turned on, and the first sensor group 41 is turned off at the timing t5 at which the main regulator 16 is turned off. Similarly, the first sensor group 41 is turned on at the timing t6 at which the ignition switch 60 is turned on, and the first sensor group 41 is turned off at the timing t10 at which the main regulator 16 is turned off.

As described above, the rotational angle detecting device 22 includes the IG switch input terminal (switching state obtaining portion) 45 that obtains the on/off state of the ignition switch 60. The first calculator 31 starts calculating the rotational angle θm when the ignition switch 60 is turned on. Accordingly, the calculation of the rotational angle θm can be started immediately after turning on the ignition switch 60.

Furthermore, the rotational angle detecting device 22 according to the second embodiment can obtain the effects similar to that of the first embodiment as described above.

Third Embodiment

A rotational angle detecting device 23 according to the third embodiment will be described below with reference to FIGS. 9 and 10.

Figure 9:
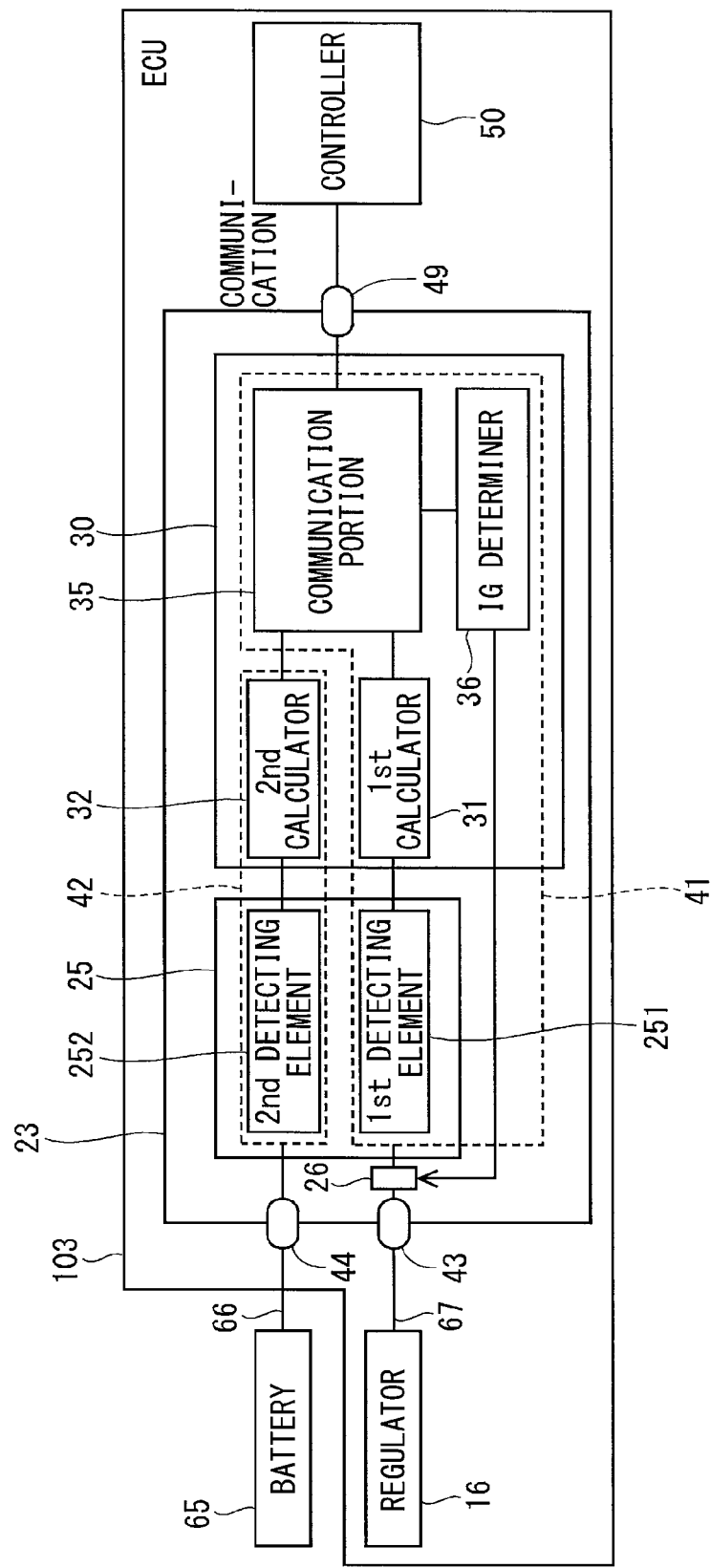
FIG. 9 is a block diagram of an electric control unit of an electric power steering device.

As shown in FIG. 9, in the rotational angle detecting device 23 of the present embodiment, an ECU 103 includes a relay 26. The ECU 103 has a configuration similar to the ECU 101 as described in the first embodiment, except the rotational angle detecting device 23. The relay 26 is disposed between the regulator voltage input terminal 43 and the first sensor group 41. When the main regulator 16 is turned on, the relay 26 is turned on and electric power is supplied to the first sensor group 41 from the main regulator 16. When the relay 26 is turned off by a command from an IG determiner 36 (described below), the power supply from the main regulator 16 to the first sensor group 41 is stopped.

The communication portion 35 receives a stop signal output from the controller 50. The stop signal is a signal to stop calculation of the rotational angle θm by the first calculator 31.

The circuit portion 30 includes the IG determiner 36. The IG determiner 36 determines that the ignition switch 60 is turned off, when the IG determiner 36 obtains the stop signal from the controller 50, and then the IG determiner 36 turns off the relay 26. Accordingly, the power supply to the first sensor group 41 is stopped, and thus the detection of the rotating magnetic field generated by the first detecting element 251, the calculation of the rotational angle θm by the first calculator 31, and the communication of signals between the communication portion 35 and the controller 50 are stopped.

The first sensor group 41 of the present embodiment is turned on when the main regulator 16 is turned on, and the first sensor group 41 is turned off when the communication portion 35 receives the stop signal from the controller 50. That is, as shown in FIG. 10, the first sensor group 41 is turned on at the timing t2 at which the main regulator 16 is turned on, and the first sensor group 41 is turned off at td1 at which the communication portion 35 receives the stop signal from the controller 50 after the timing t4 at which the ignition switch 60 is turned off. Further, the first sensor group 41 is tuned on at the timing t7 at which the main regulator 16 is turned on, and the first sensor group 41 is tuned off at timing td2 at which the communication portion 35 receives the stop signal from the controller 50 after the timing t9 at which the ignition switch 60 is turned off.

The communication portion 35 receives the stop signal from the controller 50. The first calculator 31 determines that the ignition switch 60 is turned off when the communication portion 35 receives the stop signal and the calculation of the rotational angle θm is stopped.

For example, in a case where information related to the rotational angle θm is not used during a terminating process of the controller 50, the controller 50 outputs the stop signal immediately after the ignition switch 60 is turned off. Further, in a case where information related to the rotational angle θm is used during a terminating process of the controller 50, the controller 50 outputs the stop signal upon completion of the terminating process. As described above, the stop signal can be output at any timing after the ignition switch 60 is turned off until the completion of the terminating process. Therefore, the timing to stop the calculation of the rotational angle θm can be properly set.

Furthermore, the rotational angle detecting device 23 according to the third embodiment can obtain the effects similar to that of the embodiments as described above.

Fourth Embodiment

The rotational angle detecting device 24 according to the fourth embodiment will described below with reference to FIGS. 11 and 12.

Figure 11:
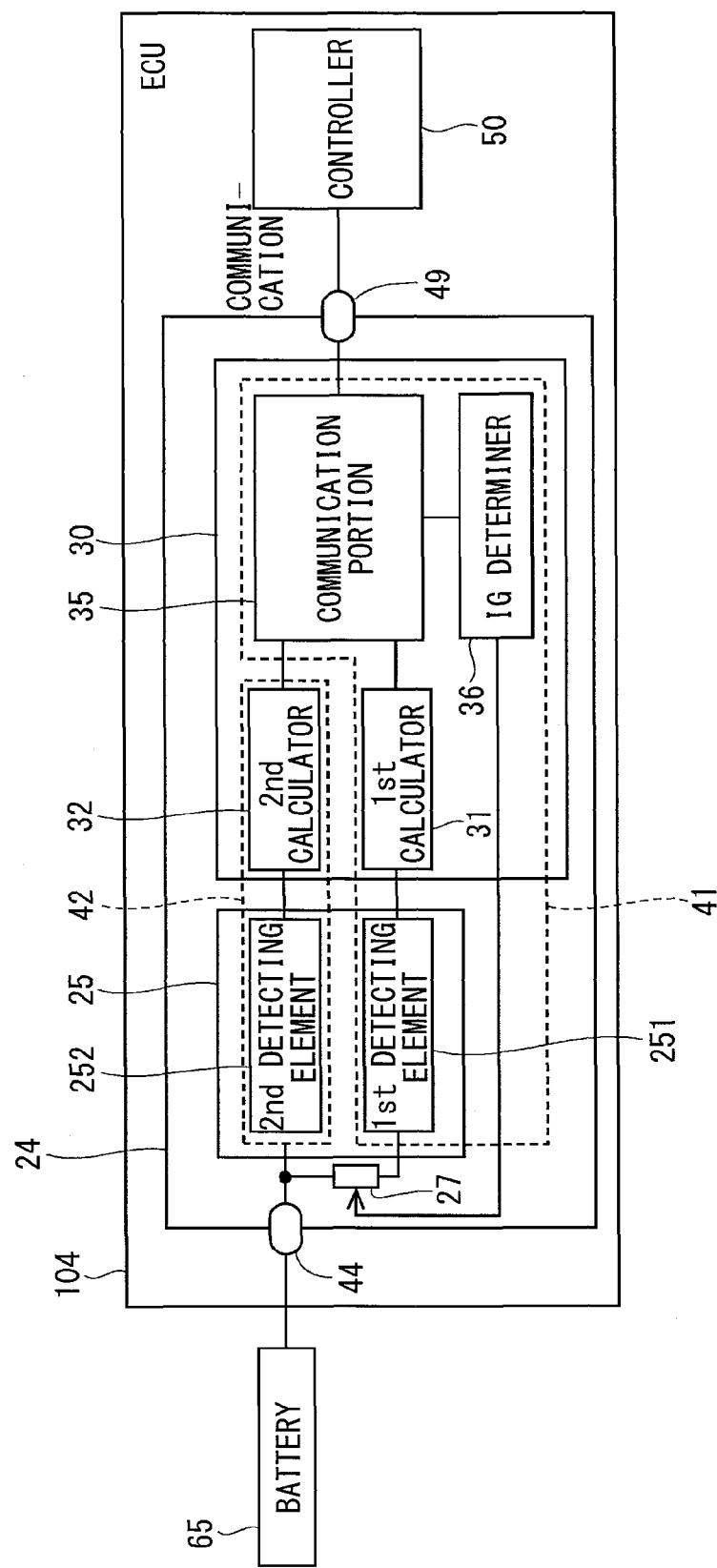
FIG. 11 is a block diagram of an electric control unit of an electric power steering device.

As shown in FIG. 11, in an ECU 104 of the present embodiment, electric power is supplied from the battery 65 to the first sensor group 41 through a battery voltage input terminal 44. That is, the rotational angle detecting device 24 does not include the regulator voltage input terminal 43. The harness 67 shown in FIG. 1 is eliminated is the present embodiment. The ECU 104 has the same configuration as the ECU 101 described in the first embodiment on other points.

The rotational angle detecting device 24 includes a relay 27. The relay 27 is disposed between the battery voltage input terminal 44 and the first sensor group 41. When the relay 27 is turned on by a command from the IG determiner 36, electric power is supplied to the first sensor group 41 through the battery voltage input terminal 44. When the relay 27 is turned off by a command from the IG determiner 36, power supply to the first sensor group 41 is stopped.

The communication portion 35 receives a start signal and a stop signal from the controller 50. The start signal is a signal to start the calculation of the rotational angle θm by the first calculator 31 and the stop signal is a signal to stop the calculation of the rotational angle θm by the first calculator 31.

The IG determiner 36 determines that the ignition switch 60 is turned on when the communication portion 35 receives the start signal, and turns on the relay 27. Therefore, electric power is supplied to the first sensor group 41, and thus the detection of the rotating magnetic field by the first detecting element 251, the calculation of the rotational angle θm by the first calculator 31, and the communication of signals between the communication portion 35 and the controller 50 are performed.

Further, the IG determiner 36 determines that the ignition switch 60 is turned off when the communication portion 35 receives the stop signal, and turns off the relay 27. As a result, the power supply to the first sensor group 41 is stopped, and thus the detection of the rotating magnetic field by the first detecting element 251, the calculation of the rotational angle θm by the first calculator 31, and the communication of signals between the communication portion 35 and the controller 50 are stopped.

The first sensor group 41 is turned on when the communication portion 35 receives the start signal from the controller 50, and the first sensor group 41 is turned off when the communication portion 35 receives the stop signal from the controller 50. That is, as shown in FIG. 12, the first sensor group 41 is turned on at timing tu1 at which the communication portion 35 receives the start signal that is output after the controller 50 is activated at the timing t3. The first sensor group 41 is turned off at timing td1 at which the communication portion 35 receives the strop signal that is output after the ignition switch 60 is turned off at the timing t4. Further, the first sensor group 41 is turned on at timing tu2 at which the communication portion 35 receives the start signal that is output after the controller 50 is activated at the timing t8. The first sensor group 41 is turned off at timing td2 at which the communication portion 35 receives the stop signal that is output after the ignition switch 60 is turned on at the timing t9.

The communication portion 35 receives the start signal from the controller 50. The first calculator 31 determines that the ignition switch 60 is turned on when the communication portion 35 receives the start signal and the calculation of the rotational angle θm is started.

According to the present embodiment, electric power is supplied to the first sensor group 41 from the battery voltage input terminal 44, and the calculation of the rotational angle θm is started or stopped based on the command (i.e., the start signal or the stop signal) from the controller 50. Therefore, a terminal to connect the first sensor group 41 to the main regulator 16 or the ignition switch 60 can be eliminated, and thus the number of the terminals can be reduced.

Furthermore, the rotational angle detecting device 24 according to the fourth embodiment can obtain the effects similar to that of the embodiments as described above.

Fifth Embodiment

Figure 13:
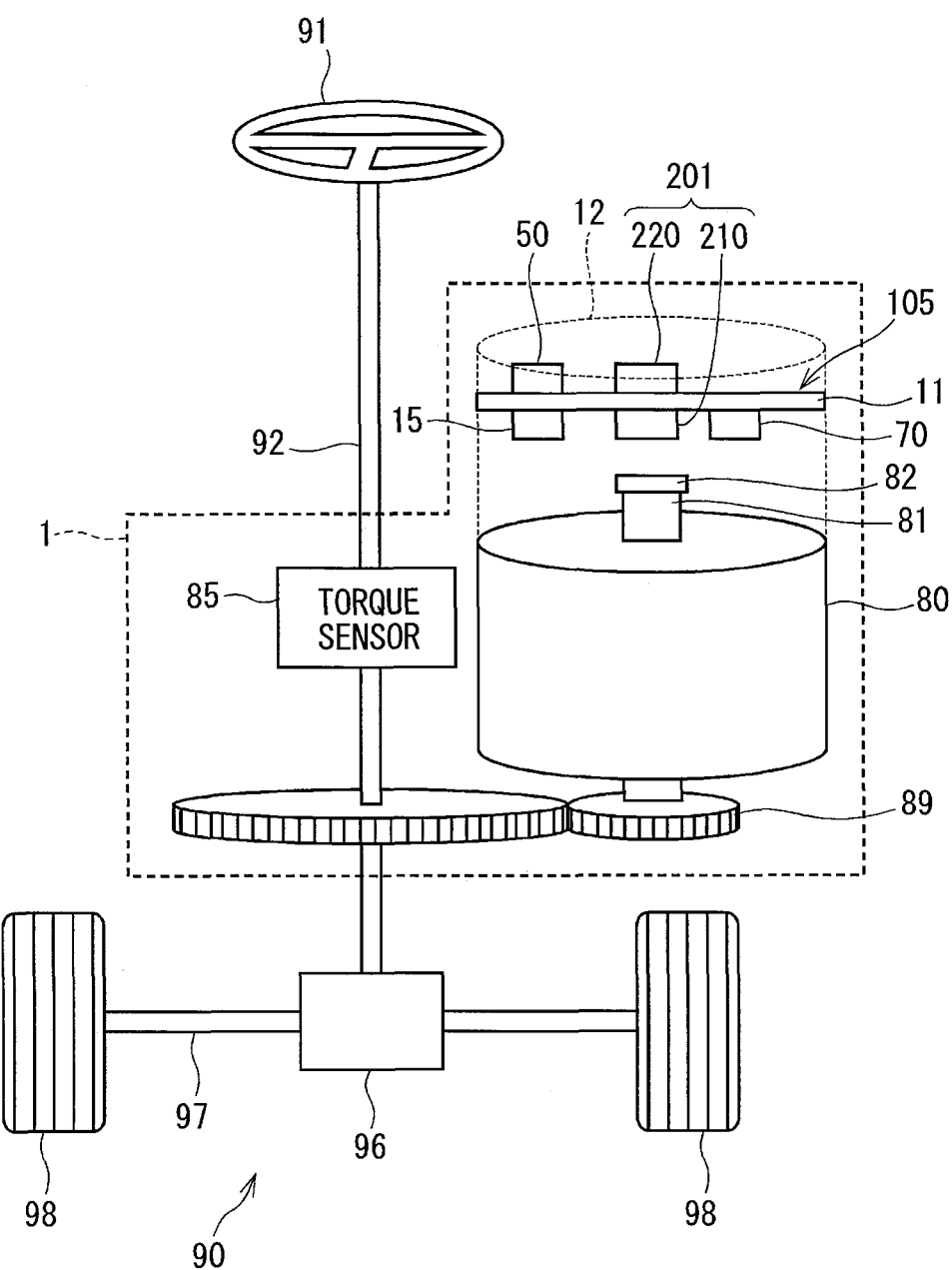
FIG. 13 is a schematic view of an electric power steering device.

Next, a rotational angle detecting device according to the fifth embodiment will be described below with reference to FIGS. 13 to 16. In FIG. 13, the relay 17, the ignition switch 60 and the battery 65 are not shown.

As shown in FIG. 13, an ECU 105 includes the integrated circuit 15, the controller 50, a rotational angle detecting device 201 and the relay (refer to FIG. 1). The rotational angle detecting device 201 includes a first sensor unit 210 and a second sensor unit 220.

The integrated circuit 15, the controller 50, the first sensor unit 210, the second sensor unit 220 and the relay are disposed on the substrate 11. The substrate 11 is positioned opposite to the magnet 82 of the motor 80 and the substrate 11 is covered with a cover 12. The integrated circuit 15 and the first sensor unit 210 are disposed on one surface of the substrate 11 facing the motor 80. The controller 50 and the second sensor unit 220 are disposed on the other surface of the substrate 11. That is, in the present embodiment, the first sensor unit 210 and the second sensor unit 220 are formed into separate packages.

The first sensor unit 210 is disposed on the substrate 11 such that the first detecting element 251 is positioned to detect the rotating magnetic field of the magnet 82.

The second sensor unit 220 is disposed on the substrate 11 such that the second detecting element 252 is positioned to detect the rotating magnetic field of the magnet 82.

Figure 14:
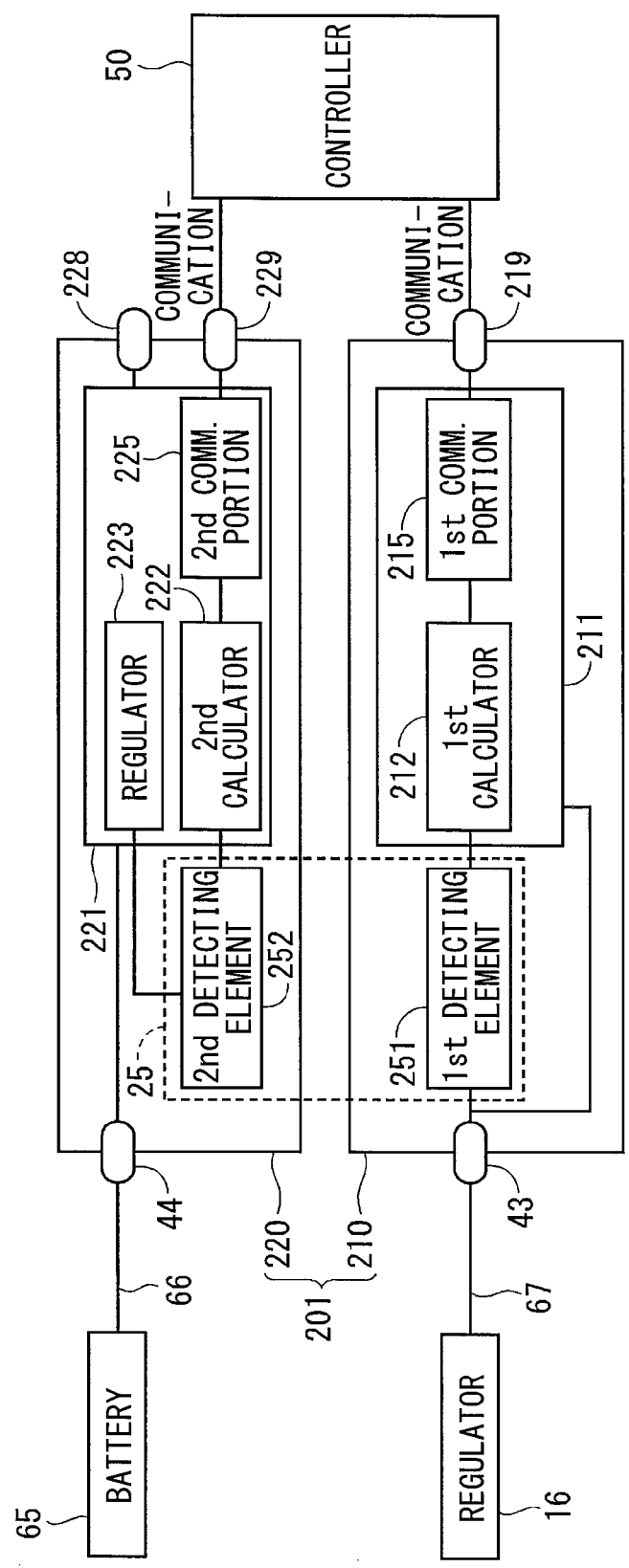
FIG. 14 is a block diagram of an electric control unit of the electric power steering device.

As shown in FIG. 14, the first sensor unit 210 includes the first detecting element 251, a first circuit 211, the regulator voltage input terminal 43 and a communication terminal 219. The first circuit 211 includes a first calculator 212 and a first communication portion 215. Electric power is supplied from the main regulator 16 (refer to FIG. 1) to the first sensor unit 210 through the regulator voltage input terminal 43.

The first calculator 212 calculates the rotational angle θm of the motor 80 based on a first detection value detected by the first detecting element 251. As with the first embodiment, the rotational angle θm is calculated when the ignition switch is on, and not calculated when the ignition switch 60 is off.

The first communication portion 215 is, for example, a serial interface. The first communication portion 215 outputs information associated with the rotational angle θm calculated by the first calculator 212 to the controller 50 through the communication terminal 219. The first communication portion 215 receives information from the controller 50 through the communication terminal 219.

The second sensor unit 220 includes the second detecting element 252, a second circuit 221, the battery voltage input terminal 44, a voltage monitoring terminal 228 and the communication terminal 229. The second circuit 221 includes a second calculator 222, an element regulator 223 and a second communication portion 225. Electric power is supplied from the battery 65 to the second sensor unit 220 through the battery voltage input terminal 44.

The second calculator 222 calculates the rotation number N of the motor 80 based on a second detection value detected by the second detecting element 252. As with the first embodiment, the second calculator 222 continue calculating the rotation number N regardless of the on/off state of the ignition switch 60. The second calculator 222 stores (retains) information of the rotation number N that is calculated when the main regulator 16 is off.

The second calculator 222 calculates a rotational speed of the motor 80 based on a terminal voltage of the motor 80 obtained from the voltage monitoring terminal 228. The rotational speed of the motor 80 may be the number of revolutions [rpm] or a rotational angular velocity [r/s]. Alternatively, the second calculator 222 may estimate the rotational speed from, for example, a rotational angular velocity based on the second detection value in place of the terminal voltage. If the rotational angular velocity is calculated based on the second detection value, the voltage monitoring terminal 228 and a terminal voltage detector 74 (described later) may be eliminated.

Figure 15:
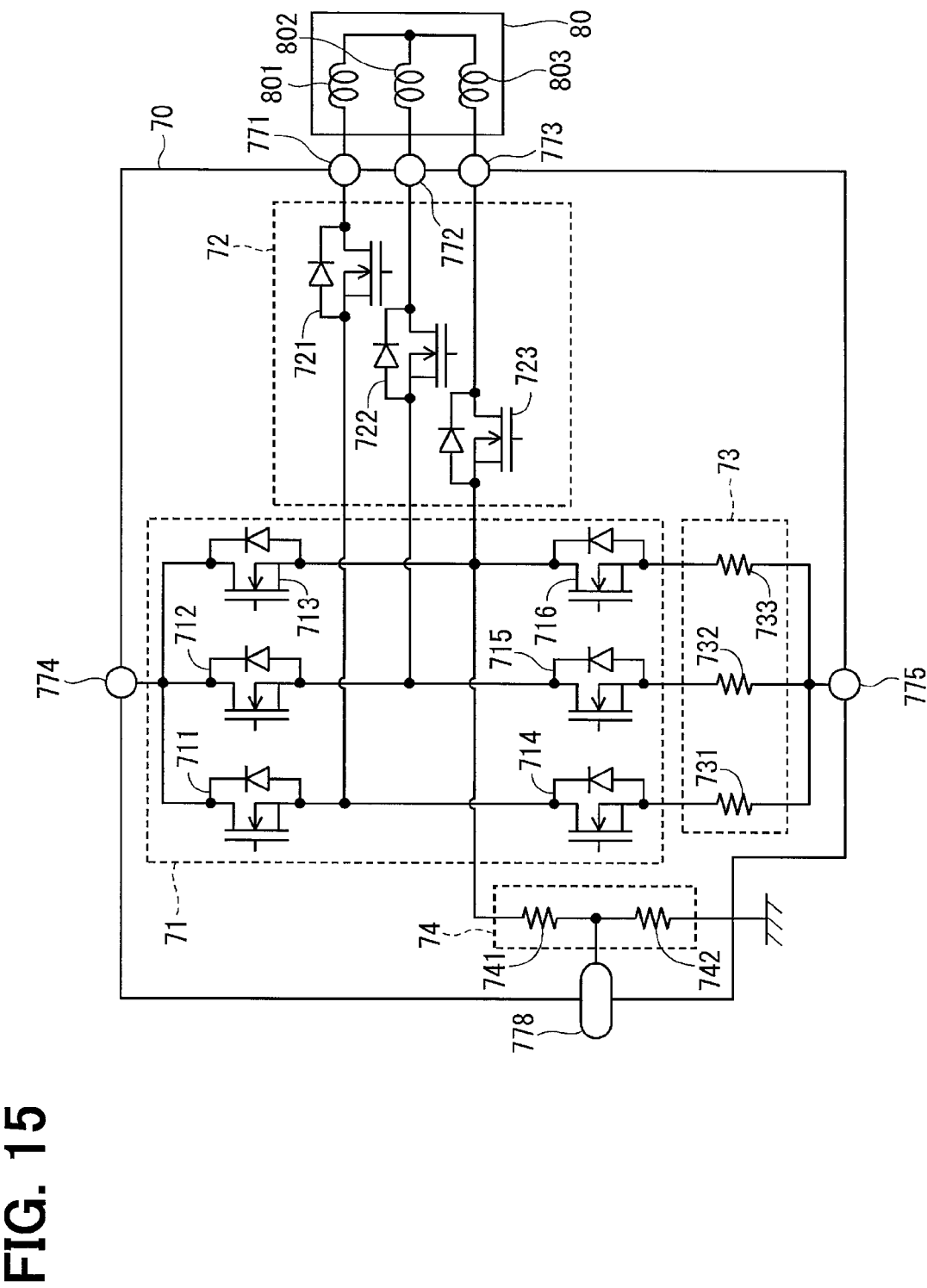
FIG. 15 is a circuit diagram of a terminal voltage detector.

FIG. 15 illustrates a circuit configuration to obtain the terminal voltage.

The motor 80 is a three-phase AC rotating machine and includes coils 801, 802, 803. Electric power is supplied from the battery 65 (refer to FIG. 1, not shown in FIG. 15) to the coils 801, 802, 803 through the inverter circuit 71.

The inverter unit 70 includes the inverter circuit 71, a motor relay portion 72, a current detecting portion 73, the terminal voltage detector 74, motor terminals 771, 772, 773, an electric terminal 774, a ground terminal 775 and a terminal voltage output terminal 778.

The inverter circuit 71 includes six switching elements 711 to 716 that are connected to each other to form a bridge circuit. The controller 50 controls the motor 80 by switching an on/off state of the respective switching elements 711 to 716.

The six switching elements 711 to 716 is classified into high-potential switching elements 711, 712, 713 and low-potential switching elements 714, 715, 716. The connecting points between the high-potential switching elements 711, 712, 713 and the low-potential switching elements 714, 715, 716 are connected to the coils 801, 802, 803 respectively through the motor relays 721, 722, 723 and the motor terminals 771, 772, 773.

A high potential side of the high-potential switching elements 711, 712, 713 is connected to a high potential side of the battery 65 through the electric terminal 774. A low potential side of the low-potential switching elements 714, 715, 716 is connected to a circuit ground through current detecting elements 731, 732, 733 and the ground terminal 775.

The motor relay portion 72 includes the motor relays 721, 722, 723. The motor relays 721, 722, 723 are respectively disposed between the coils 801, 802, 803 and the connecting points of the high-potential switching elements 711, 712, 713 and the low-potential switching elements 714, 715, 716. A current flow between the inverter circuit 71 and the motor 80 is controlled by switching an on/off state of the motor relays 721, 722, 723.

The current detecting portion 73 includes the current detecting elements 731, 732, 733. The current detecting elements 731, 732, 733 are disposed on a low potential side of the low-potential switching elements 714, 715, 716 and detect current flowing through the coils 801, 802, 803. The current detecting elements 731, 732, 733 are a shunt resistor. Voltage between both ends of each current detecting elements 731, 732, 733 are output to the controller 50 as a current detection value of current flowing through the coils 801, 802, 803.

The terminal voltage detector 74 is connected to a W-phase motor terminal (phase terminal) 773 and detects a W-phase terminal voltage. Although the terminal voltage detector 74 detects the W-phase terminal voltage in the present embodiment, the terminal voltage detector 74 may detect a U or V-phase terminal voltage. The terminal voltage detector 74 includes resistors 741, 742. The resistors 741, 742 are a dividing resistor that divides the terminal voltage into a divided value (terminal voltage detection value). The terminal voltage detection value divided by the resistors 741, 742 is output to the terminal voltage output terminal 778. A resistance value of the resistors 741, 742 is properly set such that the terminal voltage detection value can be detected by the second sensor unit 220. The terminal voltage output terminal 778 is connected to the voltage monitoring terminal 228. Thus, the terminal voltage detection value is output to the second sensor unit 220 and is used for calculating the rotational speed of the motor 80.

The element regulator 223 adjusts voltage applied from the battery 65 to a specified voltage. The voltage adjusted by the element regulator 223 is output to the second detecting element 252. Also, the voltage adjusted by the element regulator 223 is used for calculation by the second calculator 222 in the second circuit 221 and for sending and receiving data by the second communication portion 225. The voltage adjusted by the element regulator 223 may have a value less than voltage adjusted by the main regulator 16 as far as the rotation number N can be calculated with the voltage adjusted by the element regulator 223. However, the voltage adjusted by the element regulator 223 may be greater than the voltage adjusted by the main regulator 16.

It should be noted that the element regulator 223 that outputs adjusted voltage to the second detecting element 252 may be preferably disposed in the circuit portion 30 described in the first embodiment.

The second communication portion 225 is, for example, a serial interface and outputs information associated with the rotation number N calculated by the second calculator 222 to the controller 50 through the communication terminal 229. The second communication portion 225 receives information from the controller 50 through the communication terminal 229. The second calculator 222 stores (retains) information associated with the rotation number N calculated when the main regulator 16 is off. When the ignition switch 60 is turned on and the controller 50 is started, the information stored in the second calculator 222 is output to the controller 50.

In the present embodiment, the first communication portion 215 and the second communication portion 225 may correspond to "communication portion".

A calculation frequency of the rotation number N by the second calculator 222 will be described below with reference to FIG. 16. In FIG. 16, a common horizontal axis is set for all graphs, and (a) shows the rotational speed of the motor 80, (b) shows the calculation frequency of the rotation number N and (c) shows an abnormality flag. In FIG. 16 (c), "0" represents that the abnormality flag is not set, while "1" represents that the abnormality flag is set.

In the present embodiment, when the rotational speed is equal to or less than a switching determination threshold TH1, the second calculator 222 calculates the rotation number N at a first frequency. The switching determination threshold TH1 is set to a value corresponding to, for example, 100 [rpm]. When the rotational speed is greater than the switching determination threshold TH1, the second calculator 222 calculates the rotation number N at a second frequency greater than the first frequency.

More specifically, a calculation interval of the rotation number N is set to a first interval Int1 during a period from timing t20 to timing t21 during which the rotational speed is equal to or less than the switching determination threshold TH1. The first interval Int1 is set such that the rotation number N can be calculated at each detection area at least one time, when the rotational speed is the switching determination threshold TH1. It should be noted that the calculation interval of the rotation number N is the inverse of the calculation frequency thereof.

Next, the detection area will be described below.

One rotation of the motor 80 (i.e., 360 degrees) is divided into the detection areas having the rotational angle θm equal to or less than 180 degrees. The first interval Int1 is set such that a value associated with the rotation number N can be calculated at least one time at each detection area. Accordingly, when the ignition switch 60 is turned on, abnormality in calculating the rotation number N can be detected by comparing the calculation result of the rotational angle θm by the controller 50 and the value associated with the rotation number N.

Further, when one rotation of the motor 80 is divided into the detection areas having the rotational angle θm equal to or less than 120 degrees, and when the first interval Int1 is set such that the value associated with the rotation number N can be calculated at least one time at each detection area, a rotational direction of the motor 80 can be detected.

Furthermore, when one rotation of the motor 80 is divided into the detection areas having the rotational angle θm equal to or less than 72 degrees, and when the first interval Int1 is set such that the value associated with the rotation number N can be calculated at least one time at each detection area, it is possible to suppress an erroneous counting due to skipping, and the rotational direction of the motor 80 can be detected even when the skipping occurs.

It should be noted that electric consumption can be reduced by setting the calculation frequency to a low value (i.e., a long calculation interval). Thus, the calculation frequency may be set considering electric consumption, for example.

Hereinafter, "the calculation of the rotation number N" may be referred to "the calculation of the rotation number N".

In the present embodiment, the value associated with the rotation number N is a count value.

Figure 17A:
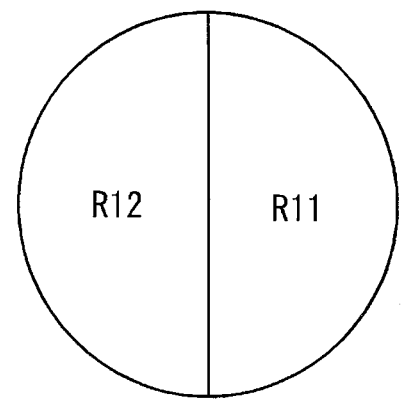
FIG. 17A is a diagram describing detection areas having a rotational angle of 180 degrees.

For example, as shown in FIG. 17A, when the detection area is set to an area having the rotational angle θm of 180 degrees, one rotation of the motor 80 is divided into two areas R11, R12. In this case, the count value "1" is assigned to each of the areas R11, R12. Therefore, when the motor 80 makes one rotation, the second calculator 222 counts two count values "2" (i.e., total value "2"). Then, the second calculator 222 counts up the rotation number N of the motor 80 every two count values. In other words, the rotation number N is counted up based on a sum of the count values.

Figure 17B:
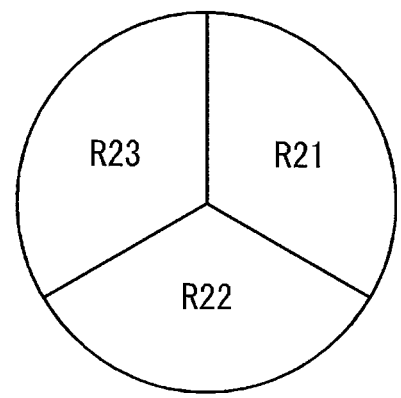
FIG. 17B is a diagram for describing detection areas having the rotational angle of 120 degrees.

Alternatively, when the detection area is set to an area having the rotational angle θm of 120 degrees, as shown in FIG. 17B, one rotation of the motor 80 is divided into three areas R21, R22, R23, and the count value "1" is assigned to each of the areas R21, R22, R23. Hence, when the motor 80 makes one rotation, three count values "3" are counted (i.e., total value "3"). In other words, the second calculator 22 counts up the rotation number N every three count values.

Figure 17C:
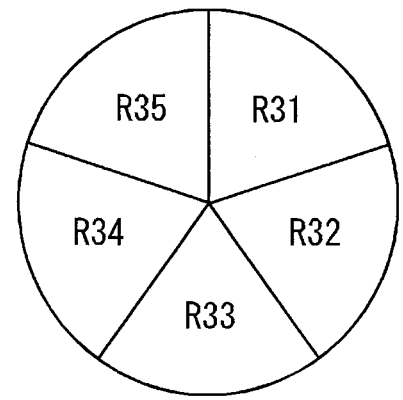
FIG. 17C is a diagram for describing detection areas having the rotational angle of 72 degrees.

Further, as shown in FIG. 17C, when the detection area is set to an area having the rotational angle θm of 72 degrees, one rotation of the motor 80 is divided into five areas R31 to R35, and the count value "1" is assigned to each of the areas R31 to R35. As such, when the motor 80 makes one rotation, five count values "5" are counted (i.e., total value "5"). In other words, the second calculator 222 counts up the rotation number N every five count values.

In FIG. 16, when the rotational speed is greater than the switching determination threshold TH1 at the timing t21, the calculation interval of the rotation number N is set to a second interval Int2. The second interval Int2 is shorter than the first interval Int1, i.e., Int1>Int2. However, when the rotational speed is greater than the switching determination threshold TH1, the rotation number N may be continuously (not periodically) calculated. This continuous calculation may be included within the concept that "when the rotational speed is greater than the switching determination threshold, the calculation interval is set to a second interval shorter than the first interval", considering the second interval Int2 as infinitesimal.

The rotational speed is equal to or less than the switching determination threshold TH1 at timing t22. In the present embodiment, a delay period Pd is provided considering the likelihood of an increase in the rotational speed of the motor 80 again. The second calculator 222 continues calculating the rotation number N with the second interval Int2 during the delay period Pd. Accordingly, when the rotational speed varies around the switching determination threshold TH1, it is possible to suppress a frequent switching of the calculation interval of the rotation number N.

The calculation interval of the rotation number N is returned to the first interval Int1 at timing t23 when the delay period Pd elapses after the rotational speed is equal to or less than the switching determination threshold TH1 at the timing t22.

When the rotational speed becomes greater than the switching determination threshold TH1 at timing t24, the calculation interval of the rotation number N is set to the second Int2 again.

Thereafter, when the rotational speed is further increased to be greater than an abnormality determination threshold TH2 at timing t25, it is determined that the rotational speed of the motor 80 exceeds an allowable rotational speed and the rotation number N cannot be calculated, and then the abnormality flag is set ("1"). Although the calculation of the rotation number N is continued after the timing t25 in FIG. 16, the calculation of the rotation number N may be stopped after the occurrence of the abnormality is determined.

The abnormality flag is output to the controller 50 when the ignition switch 60 is turned on.

The rotational speed of the motor 80 may exceed the abnormality threshold TH2 when, for example, a vehicle is jacked up or tires are replaced. When the rotational speed of the motor 80 exceeds the abnormality threshold TH2 during the off state of the ignition switch 60, the calculated rotation number N may have an abnormal value. Accordingly, the controller 50 relearns the neutral position of the steering wheel 91 when the controller 50 receives the abnormality flag. And then, the abnormality flag is reset when the relearning of the neutral position of the steering wheel 91 is completed.

In the present embodiment, the calculation interval of the rotation number N during the off state of the ignition switch 60 is variable according to the rotational speed of the motor 80. Thus, the calculation interval can be set according to the rotational speed of the motor 80, thereby reducing electric consumption.

More specifically, when the rotational speed of the motor 80 is equal to or less than the switching determination threshold TH1, the calculation interval is set to the first interval Int1. Whereas, the rotational speed of the motor 80 is greater than the switching determination threshold TH1, the calculation interval is set to the second interval shorter than the first interval. Therefore, electric consumption can be reduced especially when the rotational speed of the motor 80 is low.

The second calculator 222 calculates the rotational speed of the motor 80 based on the second detection value detected by the second detection element 252. Thus, the rotational speed of the motor 80 can be calculated based on internal information of the second calculator 222. Accordingly, the configuration to obtain, for example, the terminal voltage of the voltage monitoring terminal 228 can be eliminated.

Alternatively, the second calculator 222 may calculate the rotational speed of the motor 80 based on the terminal voltage of the motor 80. In this case, the rotational speed of the motor 80 can be properly calculated based on a counter electromotive voltage.

The terminal voltage detector 74 has the resistors 741, 742 connected to at least one phase terminal of the motor 80. The resistors 741, 742 divide the terminal voltage to the divided value (i.e., the terminal voltage detection value). The second calculator 222 obtains the divided value from the terminal voltage detector 74 and calculates the rotational speed of the motor 80 based on the divided value. Hence, the terminal voltage can be obtained within a withstand voltage scope of the second sensor unit 220 by setting the resistance value of the resistors 741, 742, whereby the second sensor unit 220 can be protected.

In the present embodiment, the terminal voltage detector 74 detects the terminal voltage of only one phase (W-phase), and thus the circuit configuration to obtain the terminal voltage can be relatively simplified.

When the rotational speed of the motor 80 is greater than the abnormality determination threshold TH2, the second calculator 222 determines that abnormality occurs. As such, abnormality in which the rotation number N cannot be calculated can be detected.

One rotation of the magnet 82 is divided into the detection areas having the rotational angle θm equal to or less than 180 degrees. The second calculator 222 calculates the value (the count value) associated with the rotational angle θm at least one time at each detection area. Therefore, abnormality in calculating the rotation number N can be detected by comparing the calculation result of the rotational angle θm by the controller 50 with the rotation number N when the ignition switch 60 is turned on.

When one rotation of the magnet 82 is divided into the detection areas having the rotational angle θm equal to or less than 120 degrees, and when the second calculator 222 calculates the value (the count value) associated with the rotational angle θm at least one time at each detection area, the rotational direction of the motor 80 can be detected.

When one rotation of the magnet 82 is divided into the detection areas having the rotational angle θm equal to or less than 72 degrees, and when the second calculator 222 calculates the value (the count value) associated with the rotational angle θm at least one time at each detection area, it is possible to suppress an erroneous counting due to skipping. Further, the rotational direction of the motor 80 can be detected even when the skipping occurs.

Furthermore, the fifth embodiment can obtain the effects similar to that of the embodiments as described above.

It should be noted that the first detecting element 251 and the second detecting element 252 may correspond to "sensor".

Sixth Embodiment

Figure 18:
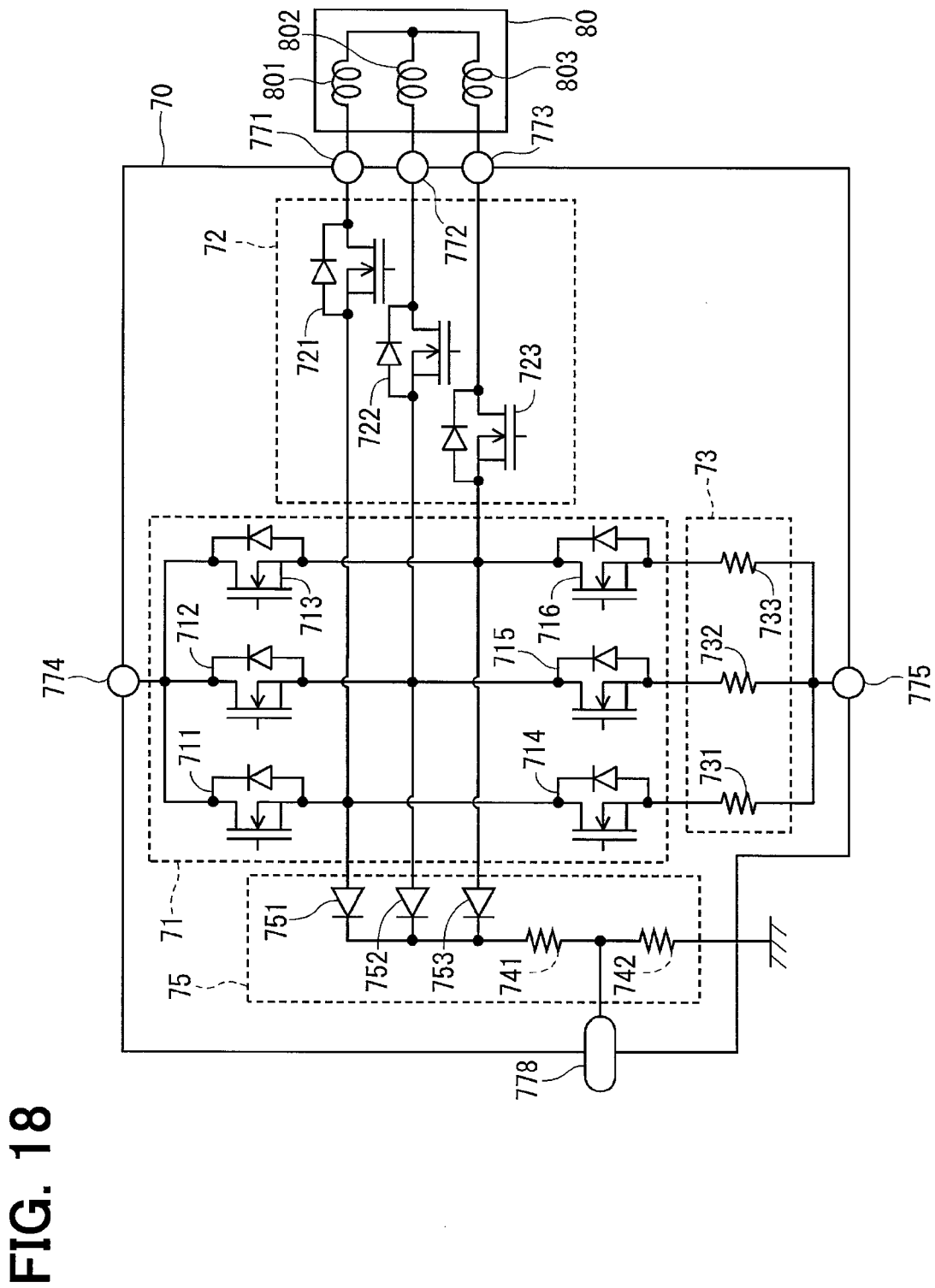
FIG. 18 is a circuit diagram of a terminal voltage detector.

FIG. 18 shows a terminal voltage detector 75 according to the sixth embodiment.

In the sixth embodiment, the terminal voltage detector 75 is different from that of the fifth embodiment, but other configurations of the sixth embodiment are the same as the fifth embodiment.

As shown in FIG. 18, the terminal voltage detector 75 includes the resistors 741, 742, which are a dividing resistor, and diodes 751, 752, 753 that allow current to flow from the motor terminals 771, 772, 773 to the resistors 741, 742. According to this configuration, the terminal voltage of the motor 80 can be continuously monitored.

Furthermore, the sixth embodiment can obtain the effects similar to that of the embodiments as described above.

Seventh Embodiment

Figure 19:
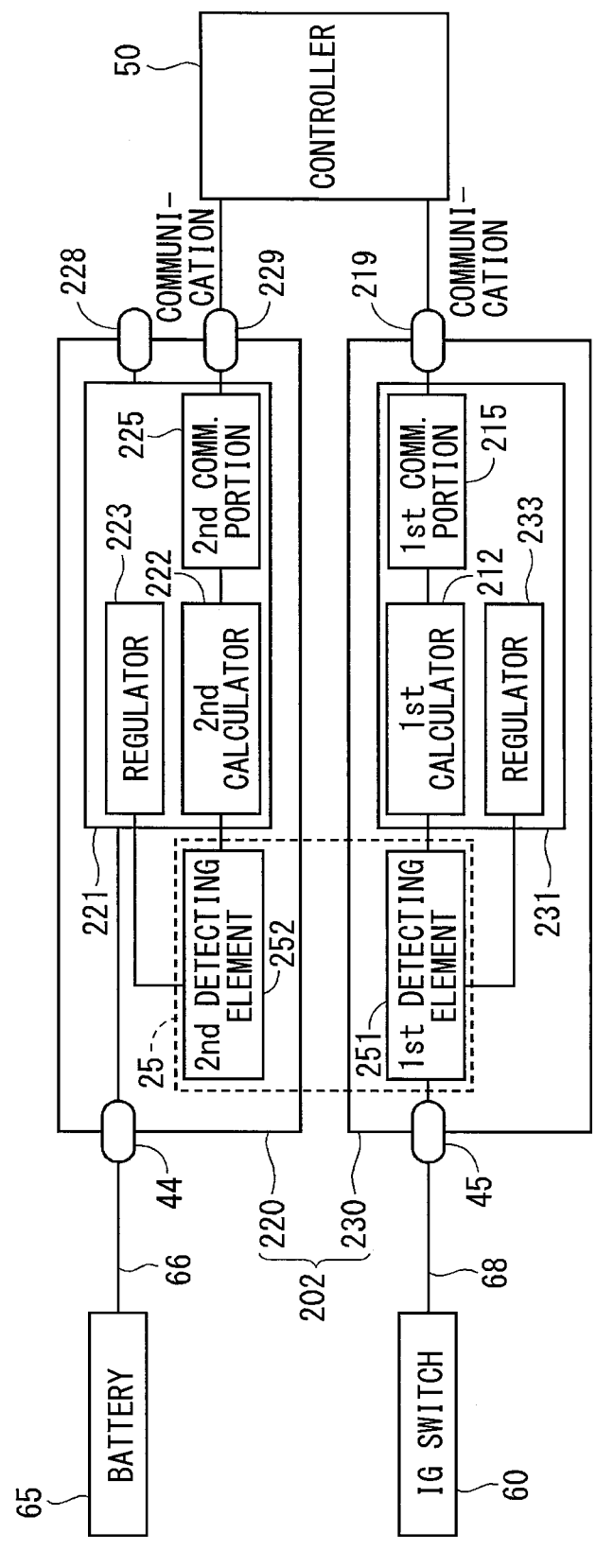
FIG. 19 is a block diagram of a rotational angle detecting device.

FIG. 19 shows a rotational angle detecting device 202 according to the seventh embodiment.

In the seventh embodiment, a first sensor unit 230 is different from that of the fifth embodiment, but other configurations of the seventh embodiment are the same as the fifth embodiment.

The rotational angle detecting device 202 includes the first sensor unit 230 and the second sensor unit 220.

The first sensor unit 230 includes the first detecting element 251, the first circuit 231, the IG switch input terminal 45 and the communication terminal 219.

The first circuit 231 includes the first calculator 212, an element regulator 233 and the first communication portion 215. The first sensor unit 230 is connected to the battery 65 through the IG switch input terminal 45 and the ignition switch 60. In other words, voltage applied to the first sensor unit 230 from the IG switch input terminal 45 is equal to a battery voltage when the ignition switch 60 is on.

The element regulator 233 is substantially the same as the element regulator 223 of the second sensor unit 220, and adjusts voltage from the battery 65 into a specified voltage. The voltage adjusted by the element regulator 233 is used for calculation by the first calculator 212 inside the first circuit 231 and for sending and receiving data by the first communication portion 215. The voltage adjusted by the element regulator 233 may be less than voltage adjusted by the main regulator 16, but the adjusted voltage may be equal to or greater than the voltage adjusted by the main regulator 16, as far as the rotational angle θm can be calculated with the voltage adjusted by the element regulator 233.

The seventh embodiment having the above-describe configurations can obtain the effects similar to that of the embodiments as described above.

Eighth Embodiment

Figure 20:
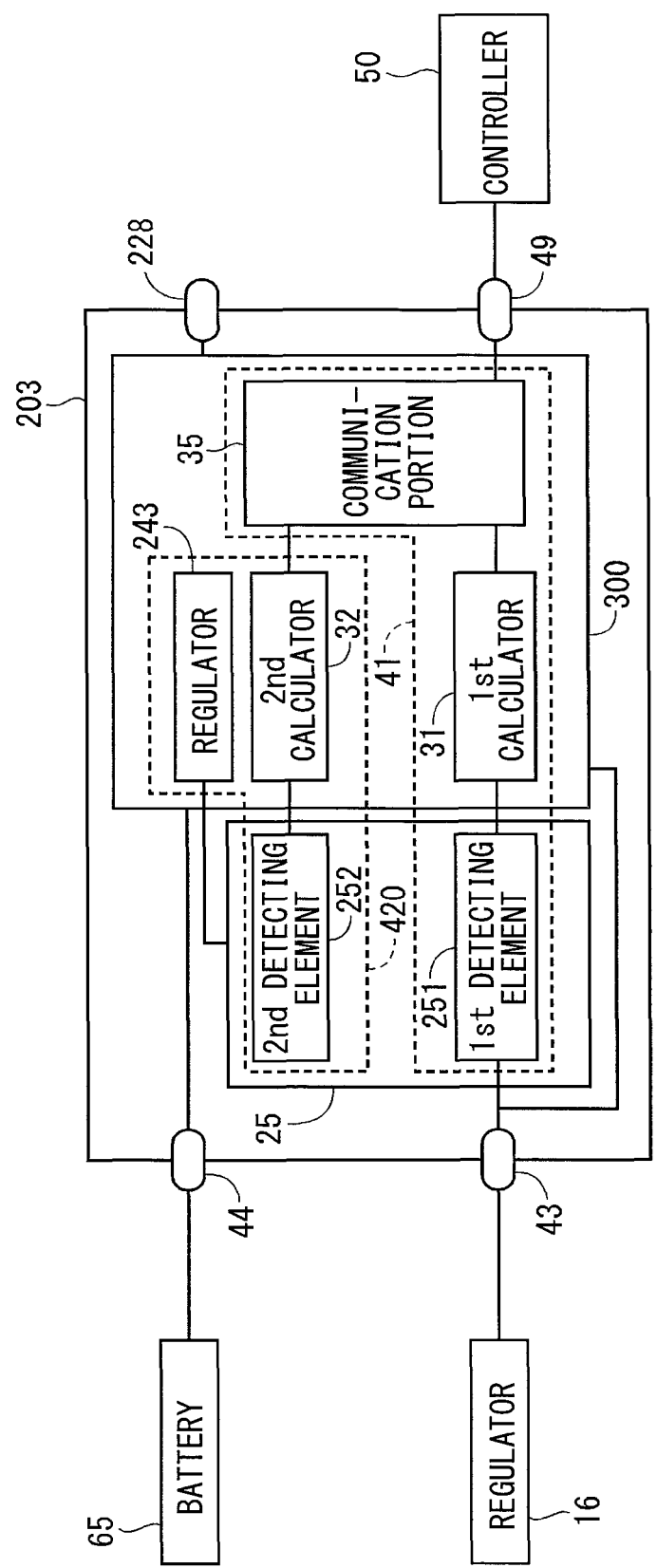
FIG. 20 is a block diagram of a rotational angle detecting device.

FIG. 20 shows a rotational angle detecting device 203 according to the eighth embodiment.

The rotational angle detecting device 203 includes the sensor 25, a circuit portion 300, the regulator voltage input terminal 43, the battery voltage input terminal 44, the communication terminal 49, and the voltage monitoring terminal 228, which are formed into one package, as with the first embodiment. The IG switch input terminal 45 may be used in place of the regulator voltage input terminal 43.

The circuit portion 300 includes the first calculator 31, the second calculator 32, the communication portion 35 and an element regulator 243. In the present embodiment, the second sensor group 420 is configured with the element regulator 243 in addition to the second detecting element 252 and the second calculator 32. The element regulator 243 is substantially the same as the element regulator 223 described in the fifth embodiment, and adjusts voltage from the battery 65 to a specified voltage. The voltage adjusted by the element regulator 243 is output to the sensor 25 and is used for calculation by the second calculator 32.

The eighth embodiment having the above-described configurations can obtain the effects similar to that of the embodiments as described above.

Other Embodiment (Rotational Information)

In the above-described embodiments, the first rotational information, the calculation of which is stopped when the ignition switch is off, is the rotational angle, and the second rotational information, the calculation of which is continued even when the ignition switch is off, is the number of rotations (the rotation number N). In the other embodiment, the first and second rotational information may be different information as far as the different information is associated with the rotation of the detection object.

Further, in the above-described embodiments, the rotational angle calculated as the first rotational information is the mechanical angle. However, in place of the mechanical angle, an electrical angle (electrical radian) may be calculated as the first rotational angle. The first calculator may execute A/D conversion to convert the detection value of the first detecting element into digital value, and the first calculator may output the converted value to the controller.

The controller may calculate the rotational angle with the converted value received from the first calculator.

(Start and Stop of Calculation of First Rotational Information)

In the first and third embodiments, when the regulator is turned on, it is determined that the ignition switch is turned on and the calculation of the first rotational information is started. In the second embodiment, when the ignition switch is turned on, the calculation of the first rotational information is started. In the fourth embodiment, when the communication portion receives the start signal from the controller, it is determined that the ignition switch is turned on, and the calculation of the first rotational is started.

Further, in the first and second embodiments, when the regulator is turned off, it is determined that the ignition switch is turned off, and the calculation of the first rotational information is stopped. In the third and fourth embodiments, when the communication portion receives the stop signal, it is determined that the ignition switch is turned off, and the calculation of the first rotational information is stopped. In another embodiment, as with the second embodiment, the IG switch input terminal may be provided, and the first calculator may stop calculating the first rotational information when the ignition switch is turned off.

In other words, as a trigger to start the calculation of the first rotational information (calculation start trigger), any one of (i) regulator-on, (ii) ignition-switch-on, and (iii) receiving of the start signal from the controller may be used. Further, as a trigger to stop the calculation of the first rotational information (calculation stop trigger), any one of (I) regulator-off, (II) ignition-switch-off, and (III) receiving of the stop signal from the controller may be used. Furthermore, any combinations of the calculation start triggers (i), (ii), (iii) and the calculation stop triggers (I), (II), (III) can be used.

When the on/off state of the regulator is used as both the calculation start trigger and the calculation stop trigger, as described in the first embodiment, the number of the terminals can be reduced. Similarly, when the on/off state of the ignition switch is used as both the calculation start trigger and the calculation stop trigger, the number of the terminals can be reduced. In addition, the communication terminal for communicating with the controller is provided regardless of the calculation start trigger or the calculation stop trigger. Thus, the number of the terminals can be reduced by using at least one of the start signal as the calculation start trigger and the stop signal as the calculation stop trigger.

(Second Rotational Information)

In the fifth embodiment, when the rotational speed of the motor is equal to or less than the switching determination threshold, the calculation interval is set to the first interval. Whereas, the rotational speed of the motor is greater than the switching determination threshold, the calculation interval is set to the second interval shorter than the first interval. In other embodiment, a plurality of switching determination thresholds may be used, and the calculation interval can be changed in step according to the rotational speed of the motor. Further, the calculation interval may be continuously changed according to the rotational speed of the motor.

The calculation interval of the rotation number may be variable according to the rotational speed of the motor regardless of the configuration of the rotational angle detecting devices, which are described in the first to the fourth embodiments.

Likewise, the second calculator may determine that abnormality occurs regardless of the configurations of the rotational angle detecting devices, when the rotational speed of the motor is greater than the abnormality determination threshold. Further, the calculation interval of the rotation number may be set to a constant value in the fifth to the eighth embodiments.

In the fifth embodiment, one rotation of the motor is divided into two, three or five detection areas, and the count value is assigned to each detection area. Then, the count value is counted at each detection area, and the rotation number is counted up based on the sum of the count value, which corresponds to the dividing number. However, the detection area may be defined in a different manner or the rotation number may be calculated in a different manner.

(Rotational Speed)

In the above-described embodiments, the rotational speed is calculated based on the second detection value or the terminal voltage. However, the configuration of the terminal voltage detector for obtaining the terminal voltage is not necessarily limited to the configuration described in the fifth embodiment or the sixth embodiment. For example, the dividing resistor may be provided for each phase of the motor and the terminal voltage may be obtained for each phase of the motor. Alternatively, the terminal voltage may be directly obtained without using the dividing resistor.

(Sensor)

In the above-described embodiments, the sensor includes the first detecting element powered by electric power through the regulator or the ignition switch, and the second detecting element powered by electric power directly from the battery. That is, the first and second detecting elements are differently powered. However, the first and second detecting elements can be powered in the same manner.

Further, the first detecting element may be eliminated and the first calculator may calculate the first rotational information based on the detection value of the second detecting element, which continues operating regardless of the on/off state of the ignition switch. With this configuration, the number of components can be reduced.

(ECU)

In the fifth embodiment, the electric components of the ECU are disposed on one surface of the substrate close to the magnet. However, the electric components of the ECU may be disposed on one surface of the substrate close to the motor or on the other surface of the substrate opposite to the motor. Further, the electric components of the ECU may be disposed separately on plural substrates. Also, the calculator or the controller except the sensor may be disposed on a member away from the motor. In this case, the sensor may be connected to the calculator or the controller through a harness.

In the fifth embodiment, the motor relay is disposed between the motor and the inverter. However, the motor relay may be eliminated.

In the above-described embodiments, the communication portion is a serial interface, but the communication portion may be configured with another component.

(Detection Object)

In the above-described embodiments, the detection object is the magnet that rotates together with the shaft of the motor. However, the rotational angle detecting device may detect a rotation of a detection object that rotates together with a member other than the motor. The rotational angle detecting device may be applied to a device other than the electric power steering device.

In the above-described embodiment, the three-phase brushless motor is used as the motor. However, any kinds of motors, such as a brush motor, may be used as the motor. Furthermore, the motor may have a plurality of winding groups and the inverter may be provided corresponding to each of the plurality of winding groups.

What is claimed is:

1. A rotational angle detecting device that continues a portion of operation by electric power from a battery when an electric switch is off, the rotational angle detecting device comprising:
   a sensor that detects a detection value that is variable according to a rotation of a detection object;
   a first calculator that starts calculating first rotational information associated with the rotation of the detection object based on the detection value detected by the sensor when the electric switch is turned on, the first calculator stopping calculating the first rotational information when the electric switch is turned off;
   a second calculator that calculates second rotational information associated with the rotation of the detection object regardless of an on/off state of the electric switch, based on the detection value detected by the sensor; and
   a communication portion that outputs the first rotational information and the second rotational information to a controller, wherein
   the first rotational information is different from the second rotational information, wherein
   a calculation interval is set to a first interval when a rotational speed of the motor is equal to or less than a switching determination threshold, and
   the calculation interval is set to a second interval that is shorter than the first interval when the rotational speed of the motor is greater than the switching determination threshold.

2. The rotational angle detecting device according to claim 1, wherein
   the detection object rotates together with a shaft of a motor,
   the first rotational information is a rotational angle of the motor, and
   the second rotational information is a number of rotations of the motor.

3. The rotational angle detecting device according to claim 2,
   wherein the second calculator calculates the number of rotations of the motor at the calculation interval when the electric switch is off, and
   the calculation interval is variable according to a rotational speed of the motor.

4. The rotational angle detecting device according to claim 3, wherein
   the second calculator calculates the rotational speed of the motor based on the detection value detected by the sensor.

5. The rotational angle detecting device according to claim 3, wherein
   the second calculator calculates the rotational speed of the motor based on a terminal voltage of the motor.

6. The rotational angle detecting device according to claim 5, wherein
   the motor has at least one phase terminal connected to a terminal voltage detector, the terminal voltage detector having a dividing resistor to divide the terminal voltage into a divided value, and
   the second calculator obtains the divided value from the terminal voltage detector and calculates the rotational speed of the motor based on the divided value.

7. The rotational angle detecting device according to claim 3, wherein
   the second calculator determines that abnormality occurs when the rotational speed is greater than an abnormality determination threshold.

8. The rotational angle detecting device according to claim 2, wherein
   one rotation of the detection object is divided into detection areas having the rotational angle of 180 degrees or less,
   a count value is assigned to each of the detection areas, and
   the second calculator counts the count value and calculates the number of rotations of the motor based on a sum of the count values.

9. The rotational angle detecting device according to claim 2, wherein
   one rotation of the detection object is divided into detection areas having the rotational angle of 120 degrees or less,
   a count value is assigned to each of the detection areas, and
   the second calculator counts the count value and calculates the number of rotations of the motor based on a sum of the count values.

10. The rotational angle detecting device according to claim 2, wherein
    one rotation of the detection object is divided into detection areas having the rotational angle of 72 degrees or less,
    a count value is assigned to each of the detection areas, and
    the second calculator counts the count value and calculates the number of rotations of the motor based on a sum of the count values.

11. The rotational angle detecting device according to claim 1, wherein
    the sensor includes
    a first detecting element that detects a first detection value when the electric switch is on and stops detecting the first detection value when the electric switch is off, and
    a second detecting element that detects a second detection value regardless of the on/off state of the electric switch, the first calculator calculates the first rotational information based on the first detection value detected by the first detecting element, and
the second calculator calculates the second information based on the second detection value detected by the second detecting element.

12. The rotational angle detecting device according to claim 1, further comprising
a regulator state obtaining portion that obtains an on/off state of a regulator, the regulator adjusting a voltage from the battery to a specified voltage and outputting the specified voltage, wherein
the first calculator starts calculating the first rotational information, when the regulator is tuned on and the regulator state obtaining portion obtains an on state of the regulator.

13. The rotational angle detecting device according to claim 1, further comprising
a switching state obtaining portion obtains the on/off state of the electric switch, wherein
the first calculator starts calculating the first rotational information, when the electric switch is tuned on and the switching state obtaining portion obtains an on state of the electric switch.

14. The rotational angle detecting device according to claim 1, wherein
the controller outputs a start signal to the communication portion, and
the first calculator starts calculating the first rotational information when the communication portion receives the start signal from the controller.

15. The rotational angle detecting device according to claim 1, further comprising
a regulator state obtaining portion that obtains an on/off state of a regulator, the regulator adjusting a voltage from the battery to a specified voltage and outputting the specified voltage, wherein the first calculator stops calculating the first rotational information, when the regulator is tuned off and the regulator state obtaining portion obtains an off state of the regulator.

16. The rotational angle detecting device according to claim 1, further comprising
a switching state obtaining portion that obtains the on/off state of the electric switch, wherein
the first calculator stops calculating the first rotational information, when the electric switch is tuned off and the switching state obtaining portion obtains an off state of the electric switch.

17. The rotational angle detecting device according to claim 1, wherein
the controller outputs a stop signal to the communication portion, and
the first calculator starts calculating the first rotational information when the communication portion receives the stop signal from the controller.

18. The rotational angle detecting device according to claim 1, wherein
the controller calculates a rotational angle of a steering shaft connected to a steering member that is steered by a driver, based on the first rotational information and the second rotational information.

19. An electric power steering device comprising:
a motor that outputs an assistance torque to assist steering of a steering member by a driver; and
an electric control unit that includes
the rotational angle detecting device according to claim 1, and
the controller that controls the motor, wherein
the detection object for the rotational angle detecting device is the motor.

* * * * *